United States Patent
Maggiore et al.

(10) Patent No.: US 11,900,549 B2
(45) Date of Patent: *Feb. 13, 2024

(54) METHOD FOR AUTOMATICALLY CAPTURING DATA FROM NON-NETWORKED PRODUCTION EQUIPMENT

(71) Applicant: Apprentice FS, Inc., Port Jefferson Station, NY (US)

(72) Inventors: Frank Maggiore, Port Jefferson Station, NY (US); Angelo Stracquatanio, Port Jefferson Station, NY (US); Milan Bradonjic, Port Jefferson Station, NY (US); Nabil Chehade, Port Jefferson Station, NY (US)

(73) Assignee: Apprentice FS, Inc., Jersey City, NY (US)

(*) Notice: Subject to any disclaimer, the term of this patent is extended or adjusted under 35 U.S.C. 154(b) by 80 days.

This patent is subject to a terminal disclaimer.

(21) Appl. No.: 17/473,925

(22) Filed: Sep. 13, 2021

(65) Prior Publication Data
US 2021/0407210 A1 Dec. 30, 2021

Related U.S. Application Data

(63) Continuation of application No. 16/700,851, filed on Dec. 2, 2019, now Pat. No. 11,145,130, and a (Continued)

(51) Int. Cl.
*G06T 19/00* (2011.01)
*H04W 4/33* (2018.01)
(Continued)

(52) U.S. Cl.
CPC .......... *G06T 19/006* (2013.01); *H04W 4/021* (2013.01); *H04W 4/029* (2018.02); *H04W 4/33* (2018.02)

(58) Field of Classification Search
CPC . G05B 19/0425; G05B 19/0426; G06F 16/20; G06F 16/44; G06F 16/50;
(Continued)

(56) References Cited

U.S. PATENT DOCUMENTS 8,977,558 B2 * 3/2015 Nielsen ................ G06Q 10/103
705/7.42
9,530,050 B1 * 12/2016 Erol ....................... G06F 16/434
(Continued)

OTHER PUBLICATIONS

Non-Final Office Action for U.S. Appl. No. 17/690,944 dated Oct. 14, 2022.

*Primary Examiner* — Abderrahim Merouan
(74) *Attorney, Agent, or Firm* — Run8 Patent Group, LLC; Peter Miller; Alexander Rodriguez

(57) ABSTRACT

One variation of a method for automatically capturing data from non-networked production equipment includes: detecting a location of a mobile device within a facility, the mobile device manipulated by an operator while performing a step of an augmented digital procedure at a machine in the facility; estimating a position of a display on the machine relative to a field of view of an optical sensor in the mobile device based on the location of the mobile device and a stored location of the machine within the facility; in response to the position of the display falling within the field of view of the optical sensor, selecting an image captured by the optical sensor; extracting a value, presented on the display, from a region of the image depicting the display; and storing the value in a procedure file for the augmented digital procedure completed at the machine.

20 Claims, 8 Drawing Sheets

Related U.S. Application Data continuation-in-part of application No. 16/678,992, filed on Nov. 8, 2019, now Pat. No. 11,301,793.

(60) Provisional application No. 62/773,763, filed on Nov. 30, 2018, provisional application No. 62/757,593, filed on Nov. 8, 2018.

(51) Int. Cl.
*H04W 4/029* (2018.01)
*H04W 4/021* (2018.01)

(58) Field of Classification Search
CPC ... G06F 16/60; G06F 3/167; H04N 21/23614; H04N 21/2365; H04W 4/029; H04W 4/70; H04W 4/33; H04W 4/021; G01C 21/206; G06T 19/006
See application file for complete search history.

(56) References Cited

U.S. PATENT DOCUMENTS

| | | | |
|---|---|---|---|
| 11,145,130 B2 * | 10/2021 | Maggiore | H04W 4/029 |
| 2017/0177807 A1 * | 6/2017 | Fabian | G16H 40/20 |
| 2019/0316912 A1 * | 10/2019 | Maggiore | H04W 4/029 |
| 2020/0167712 A1 * | 5/2020 | Stracquatanio | G06Q 10/06316 |

* cited by examiner

METHOD FOR AUTOMATICALLY CAPTURING DATA FROM NON-NETWORKED PRODUCTION EQUIPMENT

CROSS-REFERENCE TO RELATED APPLICATIONS

This Application is a continuation application of U.S. patent application Ser. No. 16/700,851, filed on 2 Dec. 2019, which claims the benefit of U.S. Provisional Application No. 62/773,763, filed on 30 Nov. 2018, each of which is incorporated in its entirety by this reference.

This Application is a continuation-in-part of U.S. patent application Ser. No. 16/678,992, filed on 8 Nov. 2019, which is incorporated in its entirety by this reference.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
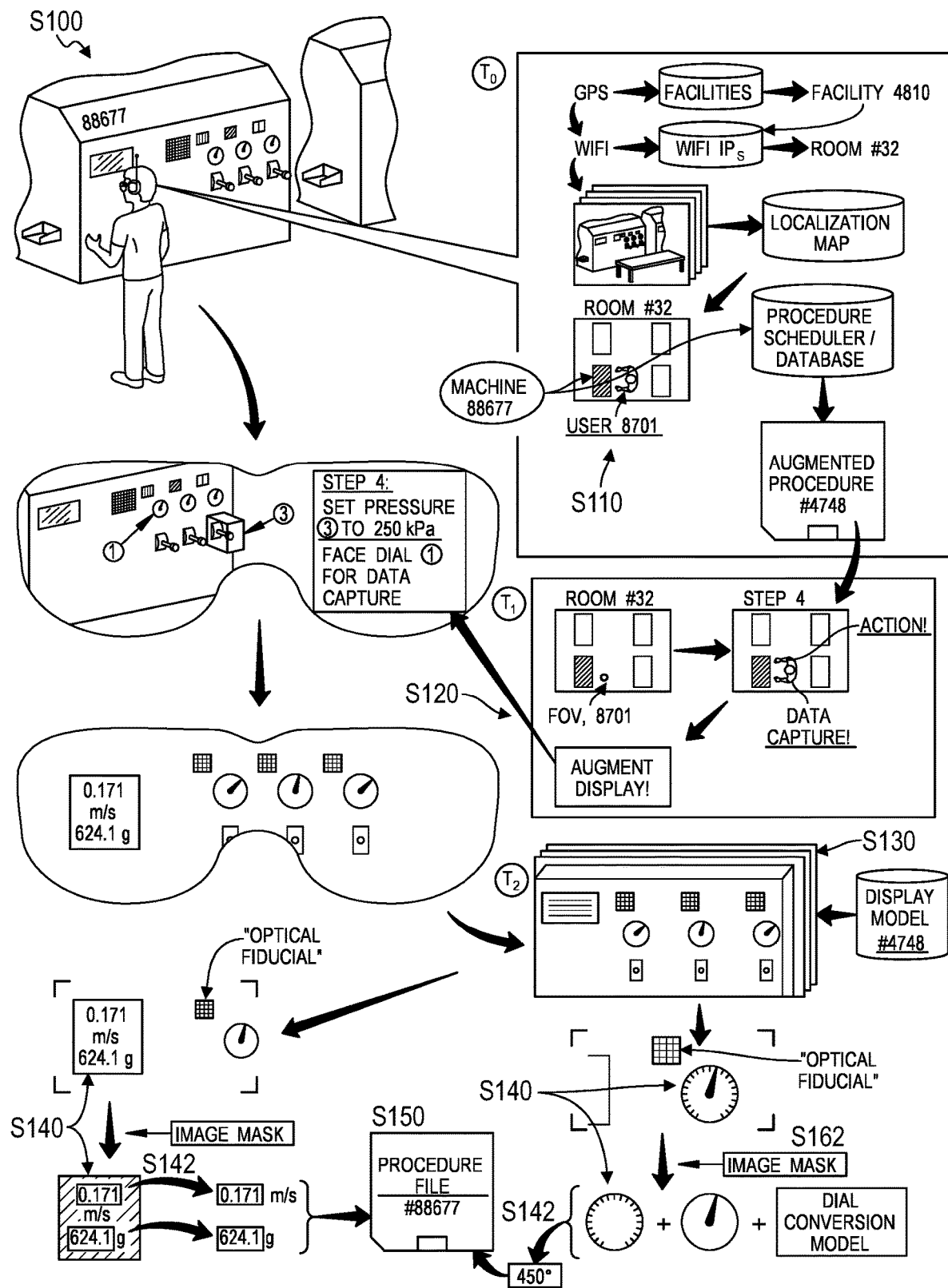
FIG. 1 is a flowchart representation of a method.

As shown in FIG. 1, a method S100 for automatically capturing data from non-networked production equipment includes: detecting a first location of a mobile device within a facility at a first time, the mobile device manipulated by an operator while performing a step of an augmented digital procedure at a machine in the facility in Block S110; estimating a first position of a display on the machine relative to a field of view of an optical sensor in the mobile device based on the first location of the mobile device and a stored location of the machine within the facility in Block S120, the step in the augmented digital procedure specifying data capture from the display; in response to the first position of the display falling within the field of view of the optical sensor at the first time, selecting a first image captured by the optical sensor at approximately (e.g., within one second, within ten seconds) the first time in Block S130; extracting a first value, presented on the display at approximately the first time, from a first region of the first image depicting the display in Block S142; and storing the first value in a procedure file for the augmented digital procedure completed at the machine in Block S150.

Figure 2:
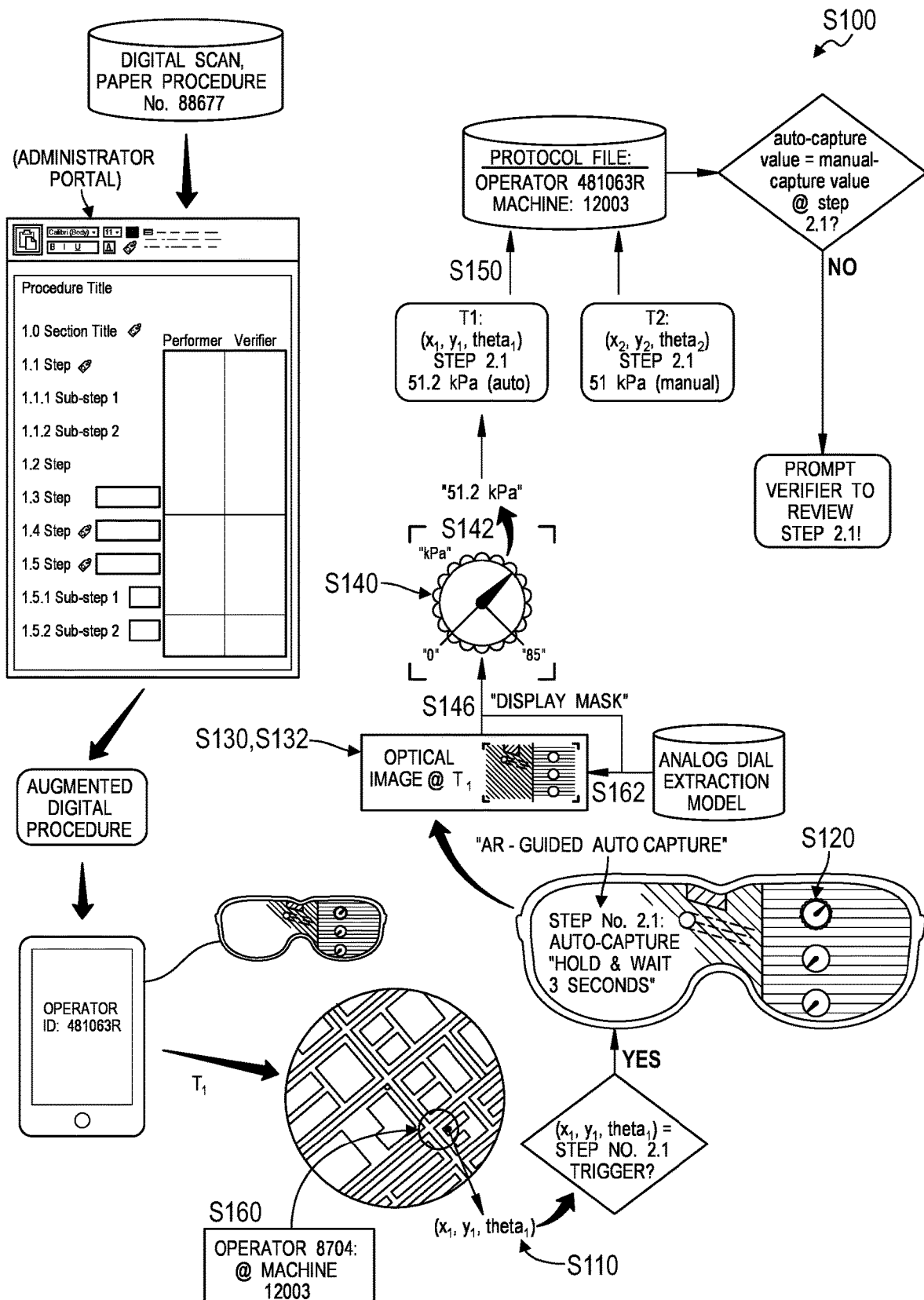
FIG. 2 is a flowchart representation of one variation of the method.
Figure 3:
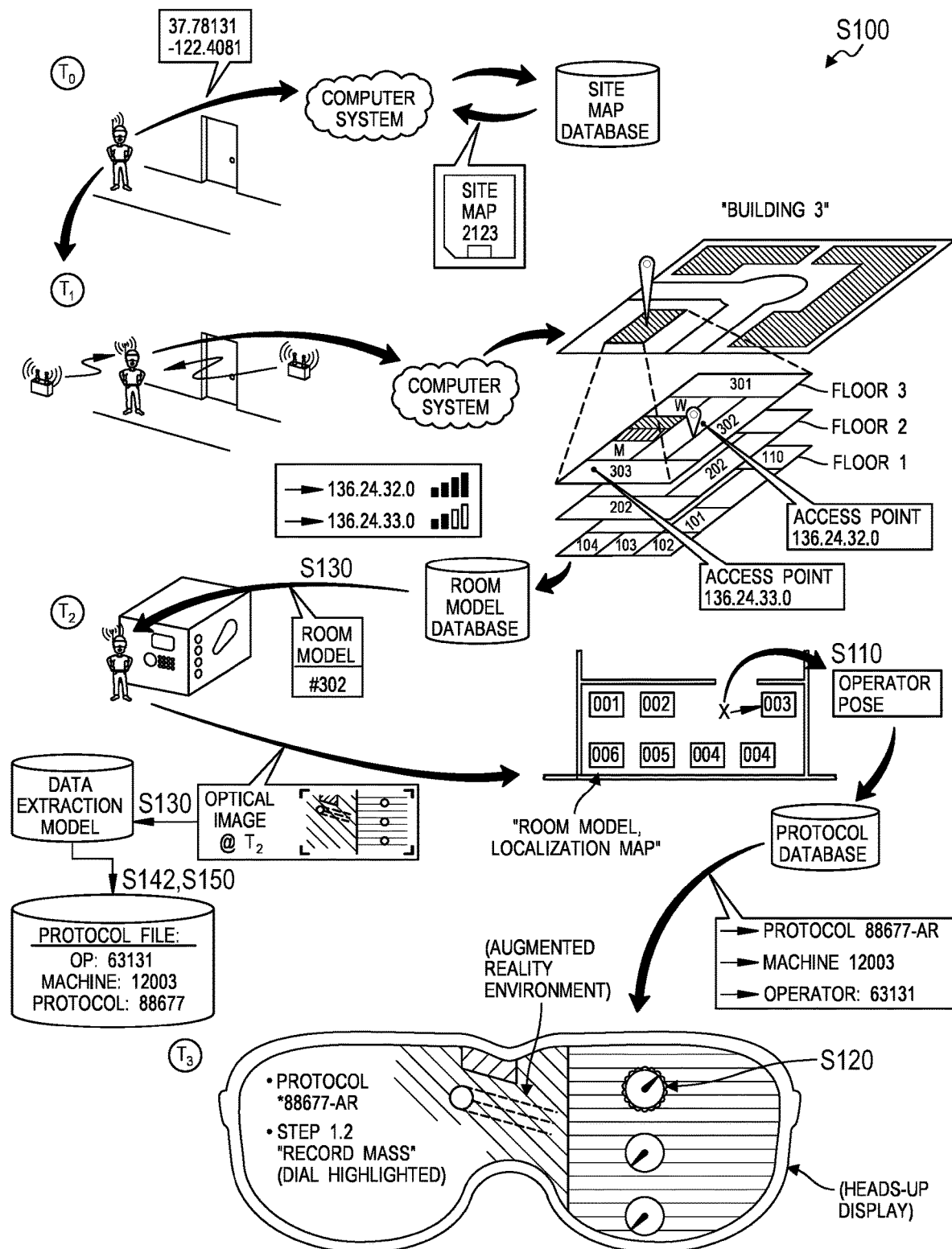
FIG. 3 is a flowchart representation of one variation of the method.

One variation of the method shown in FIGS. 2 and 3 includes: accessing a video feed captured by an optical sensor in a mobile device manipulated by an operator while performing a step of an augmented digital procedure at a machine in the facility in Block S110; accessing a definition of a feature corresponding to a display coupled to the machine, the step in the augmented digital procedure specifying data capture from the display in Block S162; scanning the video feed for the feature in Block S146; in response to detecting the feature in a first image in the video feed, detecting the display in a first region of the first image in Block S140; extracting a first value, presented on the display, from the first region of the first image in Block S142; and storing the first value in a procedure file for the augmented digital procedure completed at the machine in Block S150.

Figure 6:
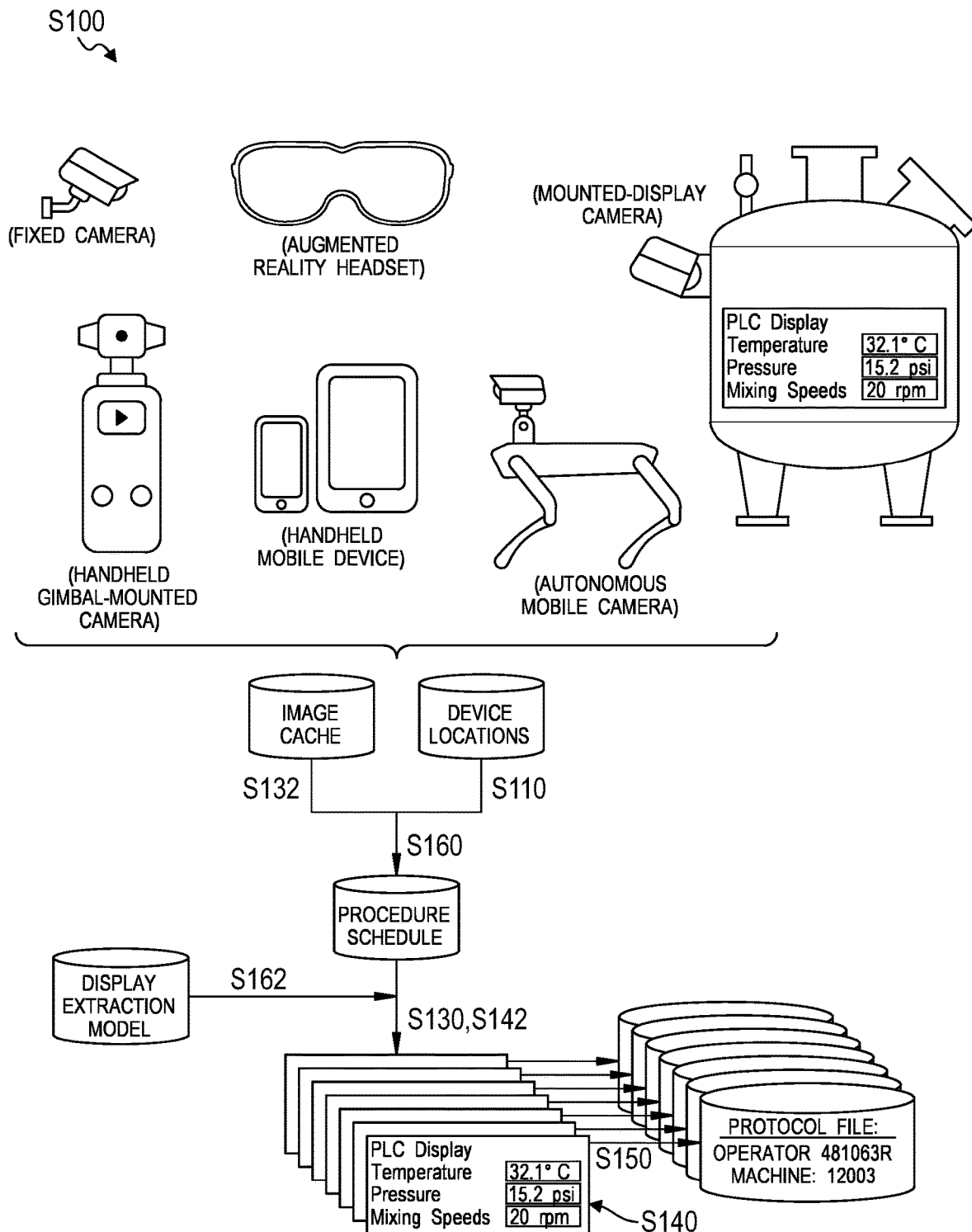
FIG. 6 is a flowchart representation of one variation of the method.

Another variation of the method shown in FIG. 6 includes: accessing a video feed captured by an optical sensor in a facility in Block S132; selecting an image in the video feed in Block S130; detecting a display on a machine depicted in a region of the image in Block S140; identifying the machine depicted in the image in Block S160; retrieving a data extraction model, from a set of data extraction models, linked to the display and the machine in Block S162; extracting a value from the region of the image based on the data extraction model in Block S142; and storing the value in a procedure file associated with the machine in Block S150.

2. Applications

The method S100 can be implemented within a production facility in order to reduce friction for recording data from non-networked (or "siloed") equipment within the facility and to support operator interfacing with, managing, and operating this equipment. In particular, the method S100 can be executed by a mobile device (and/or a fixed imaging system)—such as in conjunction with a remote computer system—within a pharmaceutical production facility to automatically detect displays (e.g., digital displays, analog dials, scales, readouts, valve orientations, analog thermometers) on a machine, read data from these displays, verify these data, and store these verified data as a human operator or technician wearing the mobile device (e.g., in the form of an augmented reality headset) or carrying the mobile device (e.g., in the form of a smartphone or tablet) performs steps within a predefined test or operating procedure at this machine. Therefore, by automatically detecting these displays in the field of view of a camera in the mobile device, automatically reading values from these displays, and automatically storing these data—such as in a procedure file specific to this machine and instance of the augmented digital procedure—according to Blocks of the method S100, the mobile device can free the operator to focus on performing actions specified in steps of the procedure and reduce opportunity for human error that may occur during manual data entry (e.g., from multiple data entries of the same information, from data entry of values in an unexpected sequence).

In addition to automatically recording data from manufacturing equipment that may be intentionally non-networked, such as to meet security requirements for pharmaceutical production equipment, the mobile device executing the method S100 can present steps of a procedure and guidance for performing these steps to the operator, such as in the form of augmented reality content including visual prompts and/or virtual overlays for aligning a camera in a mobile device to a display on a machine designated for data capture during a step of the procedure.

The method S100 can therefore be implemented within a production facility in order to guide an operator through manual completion of steps within a procedure at such a machine and to automatically record data—presented on human-vision-optimized displays arranged on this machine—on behalf of the operator.

3. System

Generally, Blocks of the method S100 can be executed by a system including: a computer system, such as a remote server or a computer network; and a mobile device, such as including or connected to an augmented-reality headset. For example, the mobile device can be an augmented reality headset, including a heads-up display, eyes-up display, head-mounted display, or smart glasses configured to render augmented reality content for an operator wearing this mobile device, as shown in FIG. 6.

Furthermore, the mobile device can include: a suite of sensors configured to collect information about the mobile device's environment; local memory configured to temporarily store a localization map of a room; and a controller configured to determine a location of the mobile device in real space, such as based on the localization map and data collected by the suite of sensors. For example, the mobile device can include: a depth camera paired with a 2D color camera; or a pair of stereoscopic 2D color cameras. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the pose of the mobile device within the room.

However, the mobile device can include any other type of sensor in any other quantity and can implement any other method or technique to calculate its pose within a room based on a localization map of the room and data recorded by these sensors.

4. Procedure Augmentation

The remote computer system can interface with an administrator through an administrator portal to construct an augmented digital procedure defining a set of steps and specifications for recording data during a procedure at a particular machine or make, model, and/or configuration of machine within the facility.

4.1 Existing Procedure Augmentation

Figure 4A:
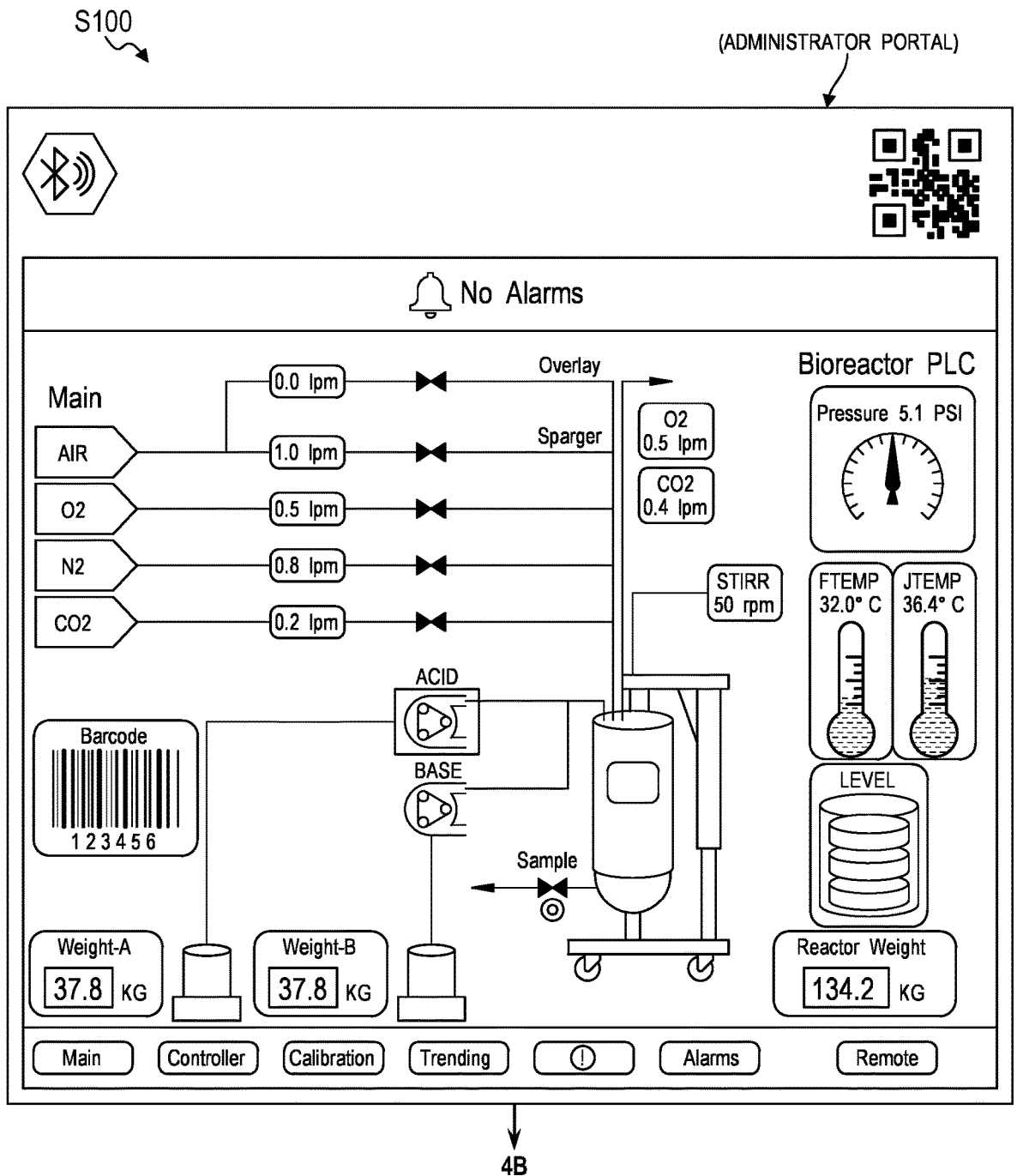
FIGS. 4A and 4B are graphical and flowchart representations of one variation of the method.
Figure 4B:
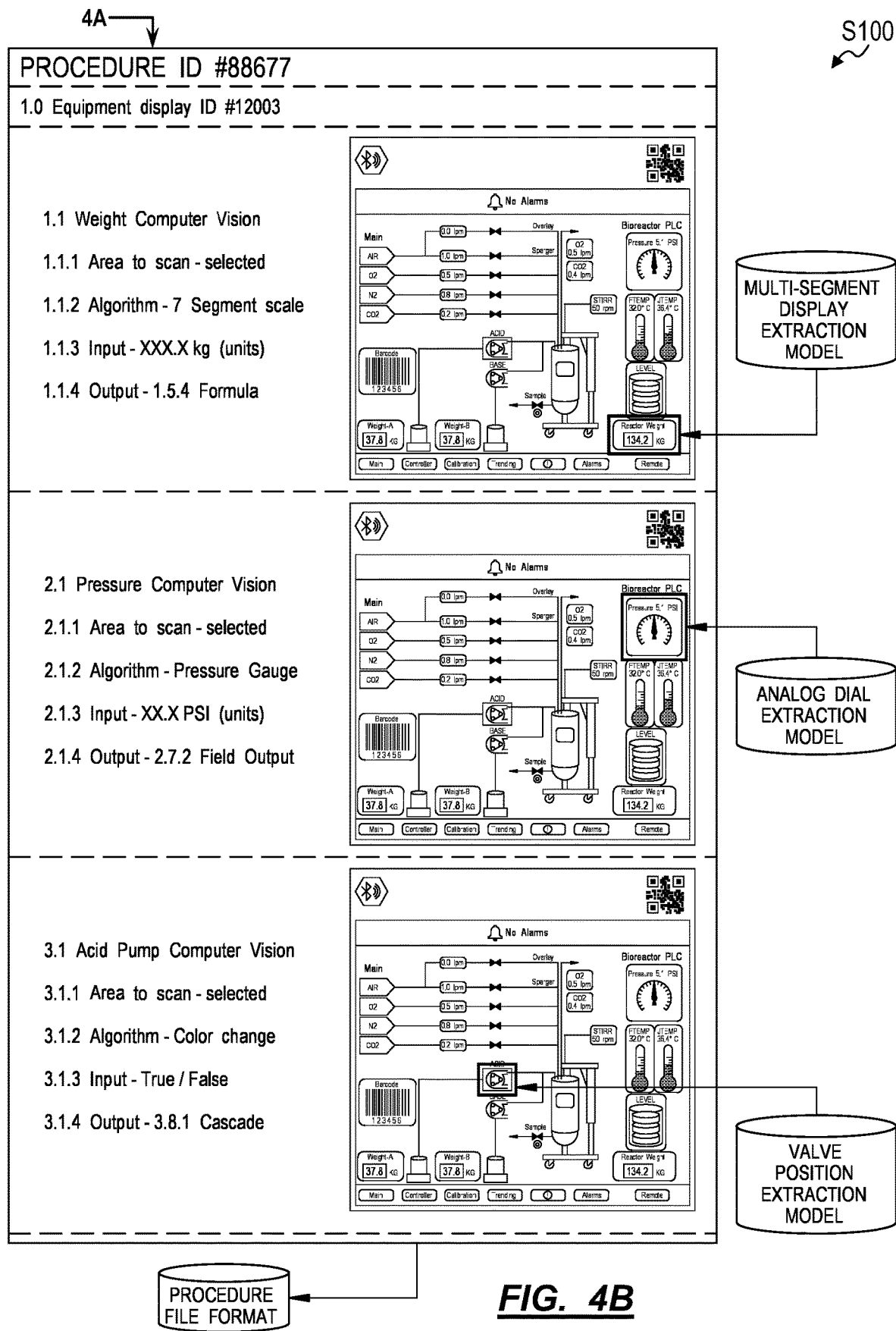

In one implementation shown in FIGS. 2, 4A, and 4B, an administrator affiliated with the facility accesses an administrator portal, accesses a procedure database, and loads a digital (e.g., vectorized, digitized) copy of a document—outlining steps of a procedure for a machine in the facility—from the procedure database into the administrator portal. (Alternately, the administrator can scan a paper copy of this document, such as with a smartphone, tablet, or dedicated scanner, and then load this digital copy into the administrator portal).

4.2 Procedure Identifier

The administrator portal can then interface with the administrator to: highlight a procedure identifier in the digital copy of this document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

Alternatively, the administrator portal (or a remote computer system) can automatically read machine and/or support equipment identifiers from this digital copy and link equipment within the facility to this identifier accordingly.

4.3 Input Fields

The administrator portal can further interface with the administrator to link input fields to steps in the digital copy and to assign data types to these input fields. In one example, the administrator selects a step in the digital copy and selects a data type from a list or menu of data types, such as including: "voice capture"; "manual note capture"; "manual numerical value capture"; "manual image capture"; and/or "automatic data capture."

For example, for a step in the procedure assigned a "voice capture" data field, a mobile device can record an audio snippet via a microphone in the mobile device when triggered by the operator or automatically when the operator is performing this step within an instance of the augmented digital procedure. For a step in the procedure assigned a "manual numerical value capture" data field, the mobile device can record a numerical value entered manually by the operator via a virtual keypad rendered on the mobile device as the operator performs this step within this instance of the augmented digital procedure. For a step in the procedure assigned a "manual note capture" data field, the mobile device can record an alphanumeric text string entered manually by the operator via a virtual keyboard rendered on the mobile device as the operator performs this step within this instance of the augmented digital procedure.

However, for a step in the procedure assigned an "automatic data capture" data field, the mobile device can automatically record an image or a video snippet via the camera in the mobile device when a display (e.g., a digital display or readout; an analog dial) depicting data relevant to the step falls within the field of view of the camera, such as while the operator performs this particular step within an instance of this procedure. The mobile device (or the remote computer system) can then automatically extract a relevant value from this image or video snippet according to a type of the corresponding input field and store these data in a procedure file for this instance of the augmented digital procedure, as described below.

The administrator can similarly assign input fields and data types to other steps in the procedure document.

4.4 New Procedure Generation

In one variation, rather than augment an existing procedure document with input fields and data types, the administrator portal can interface with the administrator to generate a new procedure for a machine in the facility. For example, the administrator portal can initialize a new (empty) digital procedure document. The administrator can then: type or copy a textual description of a step within the procedure into a step field in the new digital procedure document; enable an input field for this step; and select a data type for this input field, such as from a dropdown menu of data types; and repeat this process for other steps in the procedure. Alternatively, an administrator may build a procedure, such as by generating the procedure as an expert operator is tracked, including annotating steps performing by the expert operator during the procedure and augmenting these annotated steps with photo, video, audio, and/or 3D capture files recorded throughout this instance of the augmented digital procedure.

The administrator portal (or the remote computer system) can then compile these steps, input fields, and data types for these input fields into an augmented digital procedure.

4.5 Automatic Image Capture Triggers

The administrator portal can then interface with the administrator to define a trigger for automatic data capture for a step in the procedure document containing a data field designated for "automatic data capture."

In one implementation, the administrator portal can interface with the administrator to further enhance the augmented digital procedure with augmented reality content, as shown in FIG. 1. In one implementation, when configuring the augmented digital procedure, the administrator can access a localization map of the facility (as described above), such as including representations of: machines and equipment deployed throughout the facility; analog or digital controls on these machines and equipment; and locations of displays on these machines and equipment. The administrator can then: link the augmented digital procedure to a particular machine in the localization map; select a step of the augmented digital procedure specifying a control input into the machine; and link this step to a corresponding control—on the machine—represented in the localization map. Similarly, the administrator can: select a step of the augmented digital procedure specifying data capture; and link this step to a corresponding display—on the machine—represented in the localization map. Furthermore, the administrator can: select a step of the augmented digital procedure specifying interaction with support equipment (e.g., a scale); and link this step to a nearest location in the facility in which such support equipment is stored according to the localization map and/or link this step to an existing 3D model of this support equipment.

Thus, in this implementation, the administrator portal (or the remote computer system) can link a step of the procedure specifying manual or automatic data capture to a 3D location of the corresponding display on a machine or support equipment arranged in a fixed location within the facility. For example, the administrator portal (or the remote computer system) can define this 3D location within a coordinate system defined within the facility or within the room occupied by the machine. Later, when an operator wearing or carrying a mobile device performs this step of the procedure, the mobile device can: track its location and orientation with the facility based on features detected in a video stream recorded by a camera in the mobile device, as described below; calculate a 3D volume in the facility within the field of view of the camera in the mobile device by projecting a primary axis and an angle of view of the camera into the localization map according to the position and orientation of the mobile device; and flag a last frame or sequence of frames—recorded by the camera—for data extraction if the 3D location of the display linked to this step currently falls within the field of view of the camera.

The administrator portal (or the remote computer system) can also: access a virtual model (e.g., a set of template images, a representative constellation features, a parametric model) of the display on the machine or support equipment; and further link this step of the procedure to this virtual model. For example, the display can include: an analog rotary dial; an analog rotary or linear gauge; an analog scale; an analog or digital seven-segment display; a monochrome digital display; a digital color display (e.g., an LED LCD display); or a CRT display; etc. The administrator portal (or the remote computer system, or the administrator) can thus: select a generic model for a type of this display or select a model unique to this display on this make, model, and configuration of machine or support equipment; and link this model to this step of the procedure. Later, a mobile device loaded with this augmented digital procedure (or the remote computer system) can leverage this model to identify this display directly within an image captured by a camera in the mobile device.

Additionally or alternatively, the display or a surface immediately adjacent the display can be labeled with an optical fiducial, such as a barcode, QR code, or optical emitter. The administrator portal (or the remote computer system, or the administrator) can then link a model of the optical fiducial (e.g., a code contained in the barcode; a virtual copy of the QR code) to this step. Later, a mobile device loaded with this augmented digital procedure (or the remote computer system) can leverage this model to identify this optical fiducial directly within an image captured by a camera in the mobile device and then detect the adjacent display in the image accordingly.

The administrator portal (or the remote computer system, or the administrator) can define additional parameters for image capture and data extraction for this step of the procedure. In one example, rather than present data of a single type (e.g., a current pressure or current temperature), the display may scroll or cycle through a set of data types (e.g., low pressure in psi, high pressure in psi, and current pressure in psi at a rate of 0.3 Hz). The administrator portal (or the remote computer system, or the administrator) can thus: access such data presentation characteristics of the display; and specify capture of one image (or a short sequence of three frames) during this step if the display presents data of a single type. However, if the display scrolls through data of multiple types, the administrator portal (or the remote computer system, or the administrator) can specify capture of a sequence of images spanning one cycle of the display (e.g., six seconds for a display that scrolls through three different values at a rate of 0.3 Hz) during this step. In another example, the display may present values that change substantively on short time scales (e.g., rapidly at a rate of 10 Hz) or on long time scales (e.g., slowly at a rate of 0.1 Hz). The administrator portal (or the remote computer system, or the administrator) can thus: specify capture of one image (or a short sequence of three frames) during this step if the display presents data of a single type that changes on a long time scale; and specify capture of a sequence of images (or a longer sequence of twenty frames) during this step if the display presents data of a single type that changes on a short time scale (the remote computer system can then compile data extracted from such as a sequence of frames into one value for this step).

Furthermore, the administrator portal (or the remote computer system, or the administrator) can set minimum resolution requirements capturing an image of the display during this step—such as based on a size of the display generally or sizes of characters or an indicator (e.g., a needle) on the display—in order to enable the mobile device or remote computer system to accurately detect and extract data presented on this display from an image captured by the mobile device during this step. Later, a mobile device can: calculate a maximum distance from the mobile device to the display to achieve a minimum resolution within a region of an image depicting the display based on known intrinsic and extrinsic properties of the camera in the mobile device; and then flag an image for extraction of a value from this display only if the mobile device was located within this maximum distance of the known location of the display when the image was recorded.

The administrator portal (or the remote computer system, or the administrator) can also link this step in the procedure to a data extraction model or process for extracting data presented on the display from an image captured by a mobile device during this step, such as described below. However, the administrator, the administrator portal, and/or the remote computer system can define any other parameters for recording an image of the display during a step of this procedure.

The remote computer system can further interface with the administrator through the administrator portal to define parameters for automatic image capture and data extraction for other steps within the procedure. The computer system can also parameterize this augmented digital procedure for application of this procedure and automatic data capture to multiple machines at different physical locations within the facility. Finally, the remote computer system can compile these steps and data capture parameters into an augmented digital procedure, as described above, and store this augmented procedure in a digital procedure database for later access by the operator.

4.6 Digital Draft Procedure

Additionally or alternatively, rather than interface with the administrator to manually construct a trigger for automatic data capture within a step in the procedure via the administrator portal, the remote computer system (or the administrator portal) can: compile steps extracted from the procedure, input fields defined by the administrator, and data types for these input fields into digital draft procedure; serve this digital draft procedure to a target operator (e.g., an experience operator) for completion of an exemplary instance of this digital draft procedure at a machine in the facility; access timeseries location data, a video feed, and/or manual capture data recorded during this exemplary instance of the digital draft procedure; and interface with the administrator via the administrator portal to transform these data (or can implement artificial intelligence or regression techniques automatically transform these data) from the exemplary instance of the digital draft procedure into spatial and/or temporal triggers for automatic data capture during select steps of this procedure.

In one implementation, the remote computer system (or the administrator portal) accesses a document specifying a set of steps of a procedure for an equipment type of the machine and extracts descriptions of these steps from the document, as described above. The administrator portal then: interfaces with the administrator to link a first description of a first step in the procedure—extracted from the document—to a first input field and to assign a first capture type to this first input field; and repeats this process for other steps of the procedure specifying data recordation. The remote computer system then generates a digital draft procedure containing descriptions of these set steps extracted from the procedure and linked to input fields specifying capture of data of particular capture types. The administrator portal can also prompt the administrator to identify a target operator with experience performing this procedure; and the remote computer system can queue a first instance of this digital draft procedure for completion by the target operator. In particular, the remote computer system can serve a first instance of the digital draft procedure to a mobile device—assigned to or logged into by this target operator—for completion at a machine of the equipment type specified in the procedure.

In this implementation, the remote computer system can interface with the target operator's mobile device to record: images, (2D or 3D) video clips, and/or audio clips captured by the target operator's mobile device responsive to manual triggers during the digital draft procedure; a timeseries of locations and orientations of the target operator's mobile device (e.g., within the facility globally or relative to the machine specifically, such as calculated by the mobile device or remote computer system as described below) throughout completion of this first instance of the digital draft procedure; times and/or locations of the mobile device at which the target operator triggered the mobile device to record these images, video clips, and/or audio clips during steps of the digital draft procedure; and/or times or locations of the mobile device at which the target operator manually indicated at the mobile device that she viewed a display specified for manual data recordation in the digital draft procedure. The remote computer system can then link each of these images, video clips, audio clips, and/or manual data recordation flags to a corresponding step and input field in the procedure and to a corresponding location and orientation (or range of locations and orientations) of the mobile device (e.g., in the facility generally or relative to the machine more specifically).

For a first step in the procedure containing an input field, the remote computer system can then: retrieve an image, video clip, audio clip, and/or manual data recordation flag recorded during this step of the first instance of the digital draft procedure; retrieve a location(s) and orientation(s) of the target operator's mobile device during this step of the first instance of the digital draft procedure; serve these data to the administrator via the administrator portal; and prompt the administrator to manually indicate a display depicted in these data and to specify a type of the display. For example, the administrator portal can render a color image or a (2D or 3D) video clip recorded by the target operator's mobile device during this first instance of the digital draft procedure. The administrator can then: draw a bounding box (or bounding circle) around a display depicted in this image or video clip (or otherwise indicate the display associated with the first step in the image or video clip); and specify a type of the display (e.g., analog or digital rotary dial; multi-color digital display; multi-segment digital or vane display; a split-flat display). Accordingly, the administrator portal (or the remote computer system) can: implement triangulation techniques to calculate a particular position of the display in the facility based on the location of the bounding box in the image or video clip and the location and orientation of the target operator's mobile device when this image or video clip was recorded; calculate a range of positions and orientations of the mobile device in which this bounding box—and therefore the display—may fall in the field of view of the camera in the mobile device based on the particular position of the display in the facility and optical characteristics of the camera; and define a spatial trigger for automatically capturing an image or video clip during this step in future instances of the procedure based on this range of positions and orientations. The remote computer system can also retrieve a pointer, identifier, or link to a data extraction model configured to extract a value from an image or video of a display of a type indicated by the administrator. The remote computer system can thus: define a spatial trigger for capturing data from the display on the machine during this step of the procedure based on the position of the target operator's mobile device during completion of this step in this first instance of the digital draft procedure; and link this spatial trigger and a data extraction model for extracting data from an image of this display to this first step in the procedure.

Alternatively, the remote computer system can: interface with the target operator in real-time during the first instance of the digital draft procedure to record the location and type of a display on a machine depicted in an image or in a live video feed recorded by the target operator's mobile device during this digital draft procedure; and then implement the foregoing methods and techniques to define a spatial trigger for capturing data from this display on the machine during this step of the procedure and to link this spatial trigger and a data extraction model to this step in the procedure.

Alternatively, the remote computer system can implement artificial intelligence, computer vision, and/or other techniques to automatically: detect a display in an image or video clip recorded concurrently with manual data entry by the target operator during a step in this first instance of the digital draft procedure; and identify a type of this display. The remote computer system can then implement the foregoing methods and techniques to define a spatial trigger for capturing data from this display on the machine during this step of the procedure and to link this spatial trigger and a data extraction model to this step in the procedure.

The remote computer system can execute the foregoing methods and techniques to generate a spatial trigger and link to a data extraction model for each step of the procedure associated with an input field. The remote computer system can then compile these spatial triggers and the digital draft procedure to generate an augmented digital procedure. In particular, the remote computer system can compile the set of descriptions of steps in the procedure, spatial triggers for capturing data from displays on (or near) the machine during steps of the procedure, definitions for types or formats of data captured during these steps, and links between steps, spatial triggers, capture types, and input fields for these steps into an augmented digital procedure executable on a handheld computing device (e.g., a smartphone, a tablet) or on an augmented reality headset to guide operators through instances of this procedure and to automatically capture and store data on behalf of these operators during these instances of the procedure.

Thus, in this implementation, the remote computer system can later: serve an instance of this augmented digital procedure to a mobile device carried by or assigned to an operator in preparation for performing this procedure at the same or similar machine; select an image captured by an optical sensor in this mobile device when the location of this mobile device falls within a threshold linear and angular offset from the spatial trigger defined in a current step of the augmented digital procedure; extract a value from a region of the image depicting a display according to a capture type and a data extraction model associated with this step in the augmented digital procedure; and then automatically store this value—linked to an input field associated with this step of the augmented digital procedure—in a procedure file for this instance of the augmented digital procedure.

However, the remote computer system, the administrator portal, and/or a target operator's mobile device can implement any other method or technique to define an automatic capture trigger for a step of the augmented digital procedure, such as automatically or in cooperation with the administrator.

4.7 Data Extraction Models

As described above, the remote computer system can associate an input field in a step in the procedure with a data extraction model, such as selected from a set or database of predefined data extraction models configured to extract values from various types of displays, as shown in FIGS. 4B, 5A, 5B, and 5C.

In one implementation, a data extraction model can define an artificial intelligence or computer vision model trained on images of a particular type of display (e.g., an analog rotary dial; a 7-segment display) to detect a display of this particular type in an image, to extract features representative of a value represented on the display, to interpret this value based on these images, and to format this value according to particular capture type. In this implementation, data extraction models for various display types—such as an analog rotary dial, a digital rotary dial, a multi-color digital display, a multi-segment digital display, a vane display, and/or a split-flat display—can be trained with sets of labeled training images and can be stored in a database of data extraction models. For example, the data extraction model database can store: a dial-type data extraction model defining detection of a dial in an image, detection of a needle within the dial in the image, and interpretation of a value from the image based on the dial and the needle; a multi-segment-type data extraction model defining detection of a multi-segment display in an image and interpretation of a value from the multi-segment display; and/or a digital-type data extraction model defining detection of a digital display in an image and interpretation of a value from the digital display.

The remote computer system can implement methods and techniques described above to link a particular data extraction model in this database to an input field in a step of a procedure during generation of an augmented digital procedure and can later retrieve a data extraction model—from the database—corresponding to a particular step of the procedure in order to automatically interpret a value from an image captured during completion of this step in an instance of this augmented digital procedure, as described below.

5. Mobile Device Localization

Figure 7:
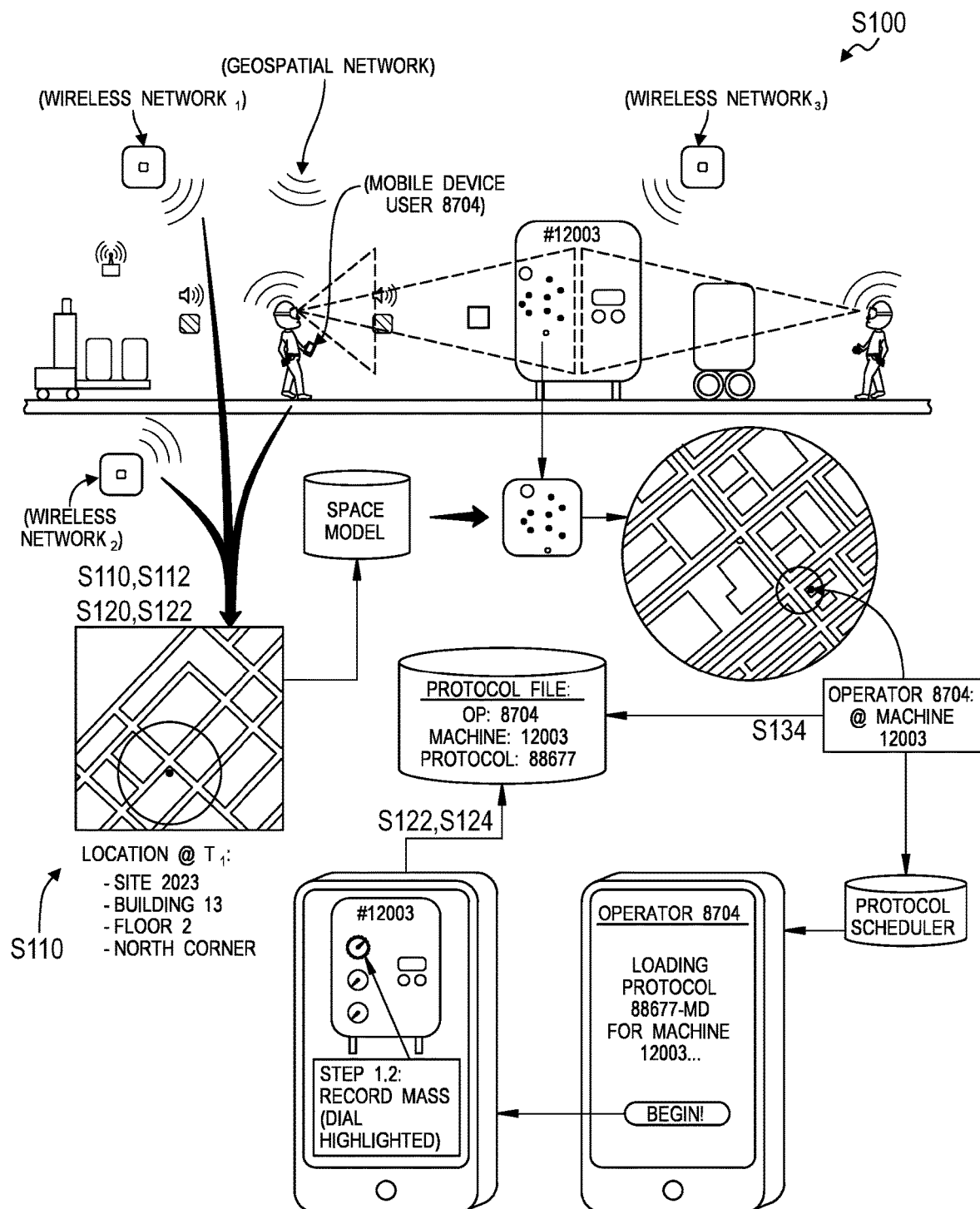
FIG. 7 is a flowchart representation of one variation of the method.

As an operator wearing or carrying a mobile device walks through the facility and approaches a machine in preparation for performing an instance of the augmented digital procedure scheduled for or associated with this machine, the mobile device (and/or the remote computer system) can track its location within the facility and identify a particular machine with which the operator is interfacing based on this location, as shown in FIGS. 3 and 7. For example, the mobile device can: determine that the mobile device is occupying a particular campus based on the mobile device's current geospatial (e.g., GPS) coordinates; determine the building, floor, and/or room that the mobile device is occupying based on wireless connectivity in the space occupied by the mobile device; and then compare features detected in images recorded by a camera in the mobile device to a 2D or 3D localization map of the building, floor, and/or room in the facility in order to determine the position and orientation of the mobile device in real space. In this example, the mobile device (or a remote computer system) can then query a map of machines throughout the facility for a particular machine adjacent and/or facing the mobile device—and therefore near the operator—based on the position and orientation of the mobile device in real space. Alternatively, the mobile device can identify the particular machine directly by matching a constellation of features detected in images recorded by the camera to a known, unique constellation of features associated with this particular machine.

The mobile device can regularly execute this process to monitor its position and orientation within the facility and detect machines nearby.

Alternatively, the mobile device can stream data to the remote computer system—such as via a computer network—while in operation within the facility, and the remote computer system can implement similar methods and techniques to detect and track the location of the mobile device in (near) real-time based on these data as the mobile device moves throughout the facility.

6. Procedure Selection

In one implementation shown in FIGS. 1 and 3, when the operator stops for more than a threshold duration of time (e.g., ten seconds) or when the mobile device determines that its location has moved less than a threshold distance within a period of time (e.g., less than one meter in a ten-second period), the mobile device can: query the digital procedure database for an augmented digital procedure associated with a machine nearest the current position of the mobile device; and automatically load an instance of this augmented digital procedure for this machine, such as if this augmented digital procedure is scheduled for completion within a current time window. In another implementation, the mobile device can implement multiple rules to trigger a new instance of the augmented digital procedure (e.g., in order to suppress false positives), such as when the operator pauses in one location for more than a threshold duration of time (e.g., remains within a one-meter floor area within a ten-second period) and continues to look in the direction of a particular machine scheduled for an instance of the augmented digital procedure (e.g., with her head oriented toward the machine for at least five seconds).

In a similar implementation, the mobile device can: rank machines in the facility by proximity to the current location of the mobile device; render a list of these machines ordered by their rank on a display of the mobile device; prompt the operator to select from the list; and download an instance of a particular augmented digital procedure associated with a machine selected by the operator.

Alternatively, the operator can manually select the particular machine directly from a dropdown list of machines, select the particular machine from a map of the facility, or select the particular augmented digital procedure directly from a dropdown list of procedures. However, the mobile device can implement any other method or technique to select and load an instance of an augmented digital procedure.

7. User-Driven Data Capture

Once the augmented digital procedure is loaded onto the mobile device, the mobile device can present content in this augmented digital procedure to the operator, as shown in FIG. 1. For example, the mobile device can: render each discrete page of the procedure document in sequential order; or consecutively render individual steps (or clusters of steps) outlined in the augmented digital procedure as the operator completes these steps over time.

As the operator performs a step of the augmented digital procedure at the mobile device, the operator may select a data input region adjacent this step in order to manually trigger data capture by the mobile device. For example, when the operator selects an input region adjacent a step tagged for manual numerical input, the mobile device can: render a 10-digit keypad; record, geotag, and timestamp a numerical value entered by the operator into this input region via the keypad; and store this numerical value—associated with this step—in the procedure file for this instance of the augmented digital procedure. In a similar example, when the operator selects an input region adjacent a step tagged for manual text string input, the mobile device can: render a keyboard; record, geotag, and timestamp a text string entered by the operator into this input region via the keyboard; and store this text string—associated with this step—in the procedure file for this instance of the augmented digital procedure. When the operator selects a virtual "record" button over or adjacent a step tagged for voice capture, the mobile device can: record, geotag, and timestamp an audio file while the record button is depressed or between two consecutive selections of the virtual record button; and store this audio file—associated with this step— in the procedure file for this instance of the augmented digital procedure.

Furthermore, when the operator selects a virtual "record" button over or adjacent a step tagged for image capture, the mobile device can: record, geotag, and timestamp an image (or a video, such as two-seconds in duration); and store this image (or this video)—associated with this step—in the procedure file for this instance of the augmented digital procedure. If this step in the augmented digital procedure further includes a definition for automatic data extraction, the mobile device (or the remote computer system) can implement methods and techniques described below to: select a particular image in this video, such as a particular image characterized by minimal blur; detect a display in a region of this image; extract a value shown on the display, etc. depicted in this region of the image; and store this value in the procedure file for this instance of the augmented digital procedure, such as in association with this step and the time that the image was recorded by the mobile device.

8. Guided Image Capture

In another implementation shown in FIGS. 1 and 2, the mobile device includes an augmented reality headset with a heads-up display. In this implementation, as an operator wearing this mobile device moves through the facility and stops at a particular machine, the mobile device can: track its position and orientation within the facility; identify an augmented digital procedure relevant to this particular machine; and automatically load an instance of this augmented digital procedure. As the operator opens a step—in this augmented digital procedure—specifying automatic data capture from a particular display on the machine, the mobile device can: calculate the global position of the display relative to the mobile device; render a description of the step on the heads-up display; and render a prompt to face a display associated with this step, such as by prompting the operator to turn left, turn right, and/or walk forward toward a known location of this display. During this step, the camera can regularly record images (e.g., at a rate of 24 Hz), and the mobile device can process these images to both localize the mobile device within the facility and to detect a known optical fiducial near the display or to detect the display directly (e.g., if a model of the display is linked to this step) in these images. When the mobile device thus detects the display, the mobile device can project a static pointer, animation, or other indicator on the heads-up display at a position that locates this indicator over the display in the operator's field of view, thereby highlighting the display for the operator. The mobile device can then: confirm whether the camera is facing the display; confirm whether the mobile device is within a maximum distance of the display; confirm whether the mobile device is sufficiently static (e.g., to minimize blur); and, accordingly, store a last image, a next image, or a current "burst" of images recorded by the camera. The mobile device can then either: execute methods and techniques described below to extract a value presented on the display from this image in real-time; or return the image to the remote computer system for extraction of this value from this image.

Similarly, as the operator opens a step—in the augmented digital procedure—specifying data capture from support equipment labeled with a barcode or QR code, the mobile device can scan images recorded by the camera for this barcode or QR code. Upon detecting this barcode or QR code in a last image captured by the camera, the mobile device can highlight this support equipment on the heads-up display and store a last image, a next image, or a current "burst" of images captured by the camera. The mobile device can also render prompts on the heads-up display: to move the mobile device nearer to the display; to center the display in the operator's field of view or the field of view of the camera in the mobile device; or to remain still while the mobile device captures images of this display.

In another implementation in which the mobile device is a handheld computing device (e.g., a smartphone, a tablet), the mobile device can implement similar methods and techniques to augment a live video feed captured by a camera in the mobile device with guidance related to capturing an image or video clip of a display on the machine. For example, during a step of the augmented digital procedure, the mobile device can: render a video feed captured by the optical sensor in the mobile device on a viewfinder (e.g., an internal display) of the mobile device; access a virtual guide associated with this step of the augmented digital procedure; render the virtual guide over the video feed on the viewfinder; prompt the operator to align the virtual guide—rendered on the viewfinder—with a display on the machine associated with this step of the augmented digital procedure; record an image through the optical sensor in response to detecting alignment between the virtual guide rendered on the viewfinder and the display on the machine; and then flag this image for data extraction according to the input field associated with this step of the augmented digital procedure. In this implementation, the mobile device (or the remote computer system) can also implement methods and techniques described above to track the location of the mobile device in the facility, estimate the position of the field of view of the optical sensor relative to the display, and render augmented guidance on the viewfinder on the internal display of the mobile device to direct the operator to align the optical sensor to the display on the machine.

Furthermore, in the foregoing implementations, the mobile device can: prompt the operator to orient the mobile device toward the display on the machine; render virtual guidance to guide the operator in achieving proper orientation of the mobile device relative to the display; and implement methods and techniques described above and below to automatically record an image of the display on the machine when the display is predicted to fall in the field of view of the optical sensor based on a known location of the display in the facility (such as stored in a localization map of the facility), the detected location of the mobile device, and optical characteristics of the optical sensor in the mobile device.

However, the mobile device can implement any other methods or techniques to guide the operator when recording an image or video clip of a display on the machine (or an a supporting equipment unit nearby).

9. Passive Image Capture

The mobile device can additionally or alternatively record an image or video clip automatically (or "passively") while the operator performs a step in this instance of the augmented digital procedure.

In one implementation, once the mobile device automatically selects, loads, and initiates an instance of the augmented digital procedure and/or once the operator selects or confirms this instance of the augmented digital procedure, the mobile device can: initiate capture of a video through the camera in the mobile device; and timestamp and geotag each frame in this video feed or record a synchronized timeseries of locations of the mobile device (e.g., within the facility generally or relative to the machine more specifically). For example, the mobile device can annotate a frame of the video with: a GPS location of mobile device; a facility associated with this GPS location; a set of wireless networks connected to the mobile device; a room or floor in the facility associated with this set of wireless networks; and/or a specific location and orientation of the mobile device—determined by the mobile device by comparing features in the frame to the localization map—at the time the frame was recorded by the mobile device.

In this implementation, once the operator completes the last step in the procedure, terminates the procedure, or moves away from the machine, the mobile device can cease capture of this video. The mobile device can then process frames in this video locally according to methods and techniques described below or upload this video to the remote computer system for such processing.

For example, the mobile device can: record a continuous video (e.g., at a frame rate of 24 Hz) during completion of this procedure by the operator; record a synchronized timeseries of locations of the mobile device; and record timestamps or a timeseries of start and stop times of steps and manual capture times in this instance of the augmented digital procedure throughout the augmented digital procedure. Upon completion of this instance of the augmented digital procedure, the mobile device can upload these data to a remote database, and the remote computer system can process these data as described below to extract values from frames in the video feed and to write these values to a procedure file for this instance of the augmented digital procedure. In particular, the remote computer system can process geotags linked or synchronized to frames in this video to isolate a subset of these frames that were recorded by the camera when one or more displays of interest—designated by the augmented digital procedure—fell within the field of view of the camera and fell within a maximum distance of the mobile device. The remote computer system can then implement methods and techniques described below to extract values presented on these displays, during this instance of the augmented digital procedure, from this subset of images.

Alternately, the mobile device can stream these data to the remote computer system in (near) real-time during completion of this instance of the augmented digital procedure, and the remote computer system can execute methods described herein to extract values from these data and to write these values to a procedure file for the augmented digital procedure accordingly.

Yet alternatively, the mobile device can execute these methods locally in (near) real-time to extract values from these data recorded by the mobile device during this instance of the augmented digital procedure and to populate a procedure file for this augmented digital procedure with these values. For example, during operation, the mobile device can capture a video feed via its integrated optical sensor.

Once a next frame in the video feed is captured and stored in a local cache, the mobile device can extract a constellation of features from the image and calculate a location and orientation of the mobile device—within a local copy of a localization map of the facility—that aligns this constellation of features to corresponding features in the localization map. The mobile device can then: project a field of view of the optical sensor into the localization map based on the first location of the mobile device, the first orientation of the mobile device, and known optical characteristics of the optical sensor; and predict presence of the display in the field of view of the optical sensor in response to the field of view of the optical sensor—projected onto the localization map—containing a known or stored location of the display represented in the localization map.

A handheld computing device—such as a smartphone, tablet, or other mobile computer—can implement methods and techniques similar to those described above to present augmented reality guidance to an operator performing an instance of the augmented digital procedure, to capture data when triggered manually by the operator, to selectively capture data automatically, and/or to capture images continuously—for real-time or asynchronous processing and data extraction—during this instance of the augmented digital procedure.

(Furthermore, a second mobile device carried or worn by a secondary operator working in proximity to the machine—as the (primary) operator performs steps of this augmented digital procedure—can implement similar methods and techniques to passively capture data representation a state of the machine or of a process occurring at the machine. This second mobile device or the remote computer system can then implement similar methods and techniques to extract values from these data captured by the second mobile device and to write these data to the procedure file for the augmented digital procedure performed by the (primary) operator.

10. Image Filtering

Therefore, the mobile device can collect single images, a sequence (or "burst") of images, a video clip, or a continuous video during completion of a step of the augmented digital procedure by the operator. The mobile device can then filter these images or video frames to isolate one or a subset of images or frames from which to extract values presented on the display. For example, for a step in the augmented digital procedure designating automatic data capture from a particular display on a machine of a particular make, model, configuration, and/or class, the mobile device (or the remote computer system) can isolate one or a small set of images: recorded by the mobile device while the step was active; recorded when the mobile device was nearest the known or predicted location of the display; recorded when the orientation of the mobile device located the known or predicted location of the display near the center of the field of view of the camera; and/or recorded while the mobile device experienced minimal rotation about any axis and minimal horizontal and vertical translation relative to the primary axis of the camera.

The mobile device (or the more computer system) can then flag this image or subset of images for data extraction, as described below.

11. Data Extraction

The mobile device (or the remote computer system) can thus select an image captured by the optical sensor in the mobile device in Block S130 and extract a value from a region of the image depicting the display in Block S142.

11.1 Display Detection

In one implementation, the mobile device (or the remote computer system) first scans the image for a region depicting the display. For example, the mobile device can implement methods and techniques described above to estimate a location of the display in the field of view of the optical sensor in the mobile device based on a known location of the display (e.g., as represented in a localization map of the facility) and the location and orientation of the mobile device at the time the image was captured. In this example, the mobile device can then isolate a particular region in the image predicted to depict the display based on this estimated location of the display in the field of view of the optical sensor at the time the image was recorded. The mobile device can then access a display model—associated with the concurrent step of the augmented digital procedure—depicting or representing identifying features of the display, content rendered on the display, or known features near the display. For example, the display model can include a template image of the display, a sparse "fingerprint" image of the display, or a parametric model representing color, spatial, and/or geometric features representative of the display and defining a boundary of the display. The mobile device can then scan the particular region of the image (and an extended area of the image around this particular region) for features representative of the display based on the display model. For example, the mobile device can: map features in (and near) the particular region of the image to like features represented in the display model; and then calculate a transform that aligns these features in the display model to the corresponding features in the particular region of the image. The mobile device can thus project the boundary of the display—defined in the display model—onto the image. The mobile device can also: crop, extract, or isolate a segment of the image contained within this projected boundary; and apply the inverse of the foregoing transform to this segment of the image in order to "flatten" or "unwarp" this depiction of the display.

Alternatively, the mobile device (or the remote computer system) can isolate a segment or region of the image depicting the display directly based on the known location of the display in the facility and location and orientation of the mobile device at the time the image was recorded.

Yet alternatively, the mobile device (or the remote computer system) can: scan an image—recorded during a particular step of the augmented digital procedure—for features representative of the display, such as based on a display model associated with this step of the augmented digital procedure as described above; and then extract a segment or region of the image in which the display is detected responsive to identifying a high-confidence match between features in the image and features represented in the display model.

However, the mobile device (or the remote computer system) can implement any other method or technique to detect a display in an image and to isolate or extract a region or segment of an image depicting a display.

11.2 Data Extraction Model

As shown in FIGS. 2, 3, 4B, 5A, 5B, and 5C, one variation of the method recites retrieving a data extraction model, from a set of data extraction models, linked to the display and the machine in Block S162. Generally, in this variation, to extract a value presented on the display from this image captured by the mobile device during this instance of the augmented digital procedure, the mobile device (or the remote computer system) can retrieve a data extraction model for this step, machine, and/or display, such as: a generic data extraction model for a known type of display, as specified in the augmented digital procedure; or a custom data extraction model constructed specifically for this display or for displays found in this make, model, configuration, and/or class of machines or support equipment. The mobile device (or the remote computer system) can then execute a sequence of image-processing actions to detect the display in a region of this image, to detect values in this region of the image, and to extract these values from the image.

As described above, the augmented digital procedure can identify a particular machine or equipment type, and a step in this augmented digital procedure associated with an input field and capture type can be linked to a data extraction model that defines extraction of values from a type of display on this machine or equipment type and specified in this step. Thus, the mobile device can retrieve a particular data extraction model—from a set of data extraction models stored in a database—specified in the augmented digital procedure, linked to the step, and corresponding to a type of the display on the machine and designated for data capture by this step. The mobile device can then extract a set of features from an isolated region of the image depicting the display and interpret a value from this set of features according to the particular data extraction model.

Alternatively, if the step of the augmented digital procedure is not associated with a data extraction model (or if the image was captured passively by the mobile device without a link to a particular step in an augmented digital procedure), the mobile device can identify the machine depicted in the image, such as based on a barcode, QR code, or other optical fiducial on the machine detected in the image or based on a known location of the machine in the facility and the location and orientation of the mobile device at the time the image was recorded. In this implementation, the mobile device can then identify a type of a display in the image, such as: by implementing artificial intelligence or computer vision techniques to detect the display directly; by detecting a particular optical fiducial associated with the display in the image; or based on a known display type arranged on the machine and the position of the mobile device relative to the known location of this display on the machine at the time the image was captured. The mobile device can then retrieve a particular data extraction model—from the database of data extraction models—associated with this display type and then implement this data extraction model to extract a value from a region of the image depicting the display, as described below.

However, the mobile device (or the remote computer system) can implement any other method or technique to selectively retrieve a data extraction model defining extraction of a relevant value from an image of a particular type of display in Block S162.

11.2.1 Example: 7-Segment Display

In one example in which the display includes a 7-segment display, the mobile device (or the remote computer system) can: convert the image of the display to grayscale; apply Gaussian blurring (e.g., with a 5×5 kernel) to reduce high-frequency noise in the grayscale image; compute an edge map of the grayscale image (e.g., with a Canny edge detector); and implement a mask or model to identify a set of contours that represent the boundary of the display (e.g., a rectangular area of a particular known aspect ratio) in the edge map. The mobile device can also project a predicted location of the display into the edge map based on a known location of the display in the facility, a position and orientation of the mobile device at the time the image was recorded, properties of the camera, and the 3D localization map of the facility and verify that this set of contours represent the boundary of the display accordingly. The mobile device can then: extract a region of the grayscale image bounded by this set of contours; apply a four-point perspective transform to this region of the grayscale image to generate a warped image of the display; implement thresholding techniques to convert the warped image to a black-and-white image; apply morphological operations to reduce noise in the black-and-white image; detect digit contours in the black-and-white image; define bounding boxes over digit contours in the black-and-white image; and then project individual segment regions into each bounding box. Within each bounding box, the mobile device can: determine whether each individual segment region is active based on whether the average color value of pixels within this individual segment region is greater or less than a threshold value; and interpret a digit value within the bounding box based on states of individual segment regions contained within the bounding box. The mobile device can then assemble digit values from this set of bounding boxes into a final numerical value and store this final numerical value in a procedure file for this instance of the augmented digital procedure, such as in a particular input field corresponding to this display and this step in the augmented digital procedure.

11.2.2 Example: Rotary Dial

In another example in which the display includes an analog or digital rotary dial, as shown in FIGS. 1 and 2, the mobile device can: convert an image of the display to grayscale; apply Gaussian blurring to reduce high-frequency noise in the grayscale image; compute an edge map of the grayscale image; and implement a mask or model to identify a contour that represents the boundary of the dial (e.g., a circular area characterized by a dimension relative to an adjacent rectangular or linear contour or relative to a known optical fiducial near the dial); extract a region of the grayscale image bounded by this contour. The mobile device can also retrieve a first color of a needle (e.g., red), a second color on the dial (e.g., white), and a third color of tick marks on the dial (e.g., black) from the augmented digital procedure. To detect the needle on the dial, the mobile device can: extract a region of the grayscale image bounded by the contour; apply a four-point perspective transform to this region to generate a warped color image of the display; implement thresholding techniques to convert the warped image to a black-and-red image; apply morphological operations to reduce noise in the black-and-red image; detect contours in the black-and-red image; isolate a needle contour in the black-and-red image; and implement line fitting techniques to locate a long axis of the needle contour in the black-and-red image. To detect tick marks on the dial, the mobile device can: extract a region of the grayscale image bounded by the contour; apply a four-point perspective transform to this region to generate a warped color image of the display; implement thresholding techniques to convert the warped image to a black-and-white image; and detect tick contours around the edge of the black-and-white image. The mobile device can then: combine tick contours detected in the black-and-white image and the needle contour detected in the black-and-red image to generate a composite image; extend the tick contours linearly toward a center of the composite image; detect intersections of the extended tick contours; locate an origin of a polar coordinate system at the centroid of the these extended tick contour intersections; locate a polar axis of the polar coordinate system extending from the origin to a lower-most tick contained on a left side of the composite image (or at a tick contour at a location corresponding to a lowest registered value on the dial, as indicated by a model of the dial or by an optical fiducial detected in the original image); and calculate an angle between the polar axis and the long axis of the needle contour. Finally, based on a known register range of the dial or based on a predefined model for converting needle angle to registered value for this dial, the mobile device can convert the angle of the needle contour into a register value and store this register value in the procedure file for this instance of the augmented digital procedure, such as in a particular input field corresponding to this display and this step in the augmented digital procedure.

In a similar example in which the display includes an analog dial, the mobile device (or the remote computer system) can retrieve a data extraction model defining detection of a dial in an image, detection of a needle within the dial in the image, and interpretation of a value from the image based on the position of the needle relative to the dial. In this example, the mobile device can also retrieve a dial mask—linked to the step of the augmented digital procedure—containing a set of virtual dial indicators associated with the analog dial on the machine and configured to indicate values represented by a needle on the dial when the dial mask is projected onto a region of an image depicting the analog dial on the machine (or a dial of this type and scale on the same or other machine). Then, in order to extract a value from a region of an image depicting this analog dial, the mobile device can: implement methods and techniques described above to detect the analog dial in a region of an image; project the dial mask onto the analog dial thus detected in the image—such as based on an estimated position of the mobile device relative to the analog dial at the time the image was captured at the mobile device or by calculating a transform that aligns the dial mask to features detected on or near the analog dial in this region of the image—and thus combine the dial mask with the region of the image to form a composite image of the analog dial annotated with dial indicator values. (Alternatively, the mobile device can extract this region of the image depicting the analog dial, dewarp this extracted region of the image, and align the dial mask over the dewarped region of the image to form a composite image annotated with dial indicator values.) The mobile device can then: detect an analog needle in this composite image, such as by scanning the composite image for a line of pixels in a known color of the needle in this analog dial as indicated in the data extraction model, linked to the step in the augmented digital procedure, or linked to the machine more generally. Finally, the mobile device can interpret a value presented on the analog dial at the time the image was captured based on a position of the analog needle relative to the set of virtual dial indicators annotated over the composite image.

11.2.3 Example: Digital Color Display

Figure 5A:
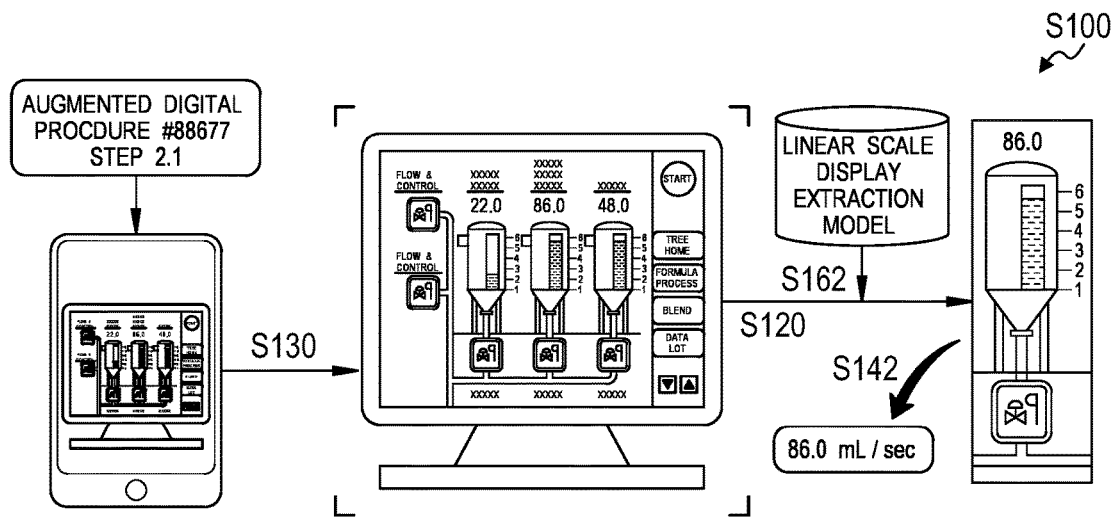
FIGS. 5A, 5B, and 5C are flowchart representations of variations of the method.
Figure 5B:
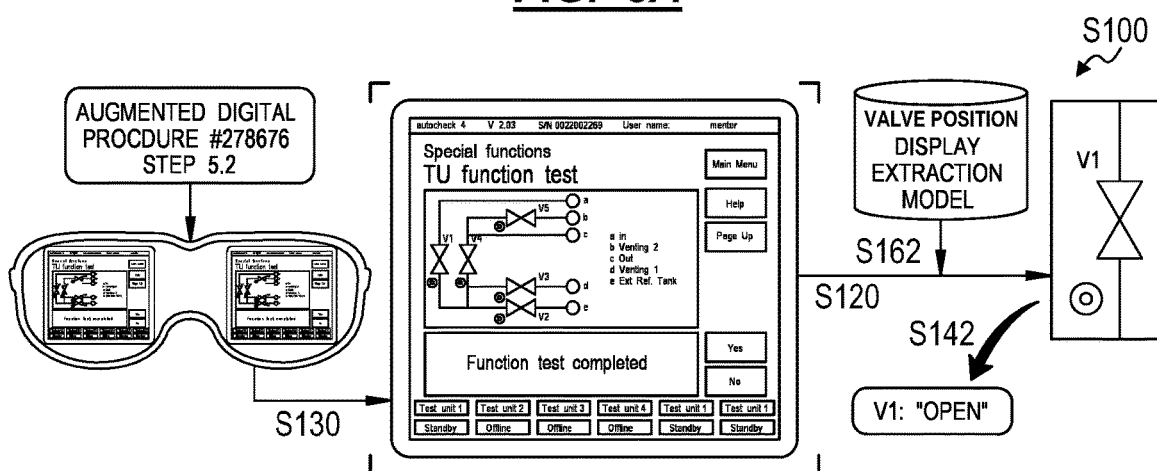
Figure 5C:
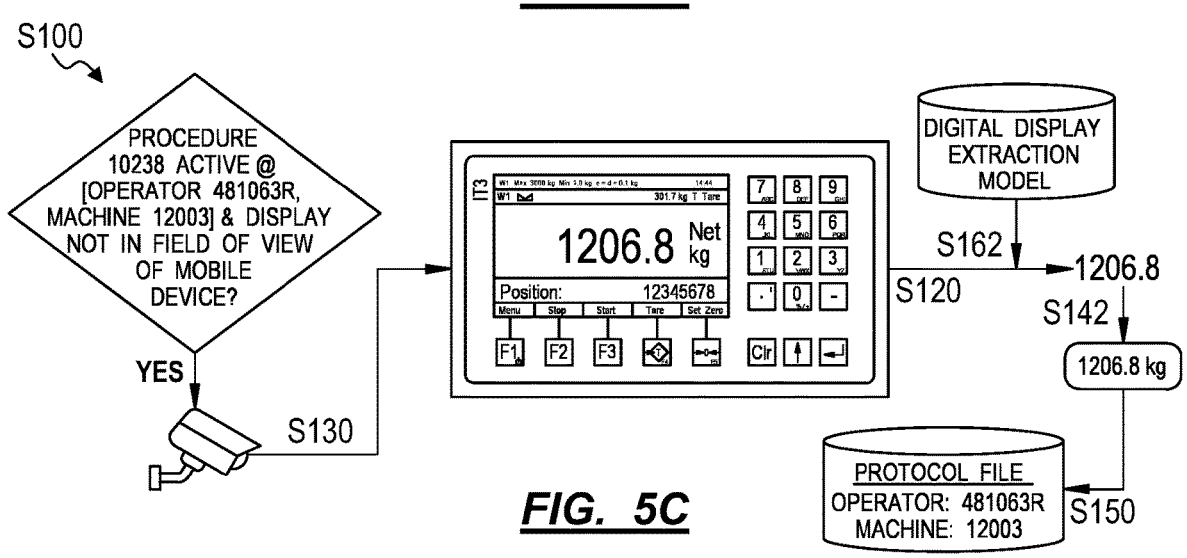

In yet another example in which the display includes a digital color display, as shown in FIGS. 1 and 5C, the mobile device can extract text rendered on this display by: converting an image of the display to grayscale; applying Gaussian blurring to reduce high-frequency noise in the grayscale image; computing an edge map of the grayscale image; implementing a mask or model to identify a set of contours that represent the boundary of the display (e.g., a rectangular area of a particular known aspect ratio; a keystone geometry as a function of viewing angle); extracting a region of the image bounded by this set of contours; applying a four-point perspective transform to this region to generate a warped image of the display; implementing thresholding techniques to convert the warped image to a black-and-white image; applying morphological operations to reduce noise in the black-and-white image; and then implementing optical character recognition techniques to detect and read text in this de-noised black-and-white image. The mobile device can then store this text in the procedure file for this instance of the augmented digital procedure.

12. Timeseries Data

The mobile device (or the remote computer system) can: execute the foregoing process for multiple images of one display recorded during one step of the augmented digital procedure; associate a value extracted from an image in this set with a time that the image was recorded by the mobile device; and thus generate a timeseries of values presented on the display during completion of this step in this instance of the augmented digital procedure.

For example, during a step of the augmented digital procedure, the mobile device can: select a sequence of images captured by the optical sensor over a duration of time specified in the step of the augmented digital procedure; implement the foregoing methods and techniques to extract a sequence of values from regions of images in this sequence that depict the display designated for timeseries data capture by this step of the augmented digital procedure; associate each value in the sequence with a time that the corresponding image was captured by the mobile device; aggregate the sequence of timestamped values into a timeseries of values displayed by the display during this step; and then store this timeseries of values—linked to the input field associated with this step—in the procedure file for this instance of the augmented digital procedure.

Additionally or alternatively, the mobile device (or the remote computer system) can: filter this timeseries of values in order to reject outliers and write this filtered timeseries of values to the procedure file; or calculate a mean, median, or mode of this timeseries of values and store this calculated value in the procedure file for this instance of the augmented digital procedure.

In another implementation in which data presented by the display settles over a period of time during the step of the augmented digital procedure, the mobile device can: detect bounce or variance in the timeseries of values extracted from this sequence of images; detect a segment of this timeseries depicting stable or "settled" values; calculate a mean, median, or mode of this segment of the timeseries; and store this calculated value in the procedure file for this instance of the augmented digital procedure. For example, the mobile device can: select a sequence of images captured by the optical sensor over a duration of time during a step of the augmented digital procedure; extract a sequence of values from regions in the sequence of images depicting the display, such as described above; calculate rates of change across values in this sequence of values; and store a particular value—in this sequence—following a segment of this sequence that exhibits less than a threshold rate of change. Furthermore, in this implementation, the mobile device (or the remote computer system) can execute the foregoing process in real-time during capture of these images during this step of the augmented digital procedure and can selectively deactivate capture and/or extraction of values from these images upon detecting a stable or "settled" value on this display.

13. Display Cycle

In one variation, the mobile device can also distinguish different cycles or frames of data rendered on the display during capture of images by the mobile device during a step of the augmented digital procedure.

In one implementation in which the display cycles through presentation of data of different types, such as specified in the augmented digital procedure, the mobile device (or the remote computer system) can: implement methods and techniques described above to transform a sequence of images reordered by the mobile device during a step of the augmented digital procedure into a timeseries of values; group similar consecutive values in this timeseries of values; link each group of values to one cycle or frame of the display, such as based on a range of values associated with each cycle or frame; select a mean, media, mode, or other value from each group of similar consecutive values; and store these values in the procedure file with links to corresponding cycles or frames rendered by the display.

In another implementation, the mobile device can: capture a sequence of images during a step of the augmented digital procedure. The mobile device (or the remote computer system) can then: detect the display in a first region of a first image in this sequence; detect a first feature in the first region of the first image corresponding to a first frame type rendered on the display, such as defined in the step of the augmented digital procedure or associated with the machine more generally; retrieve a first data extraction model associated with this first feature—and therefore with this first frame type—in this step of the augmented digital procedure; implement methods and techniques described above to extract a first value from the first region of the first image according to this first data extraction model; and then store this first value—in a first format associated with this first frame type in the step—in a procedure file for this augmented digital procedure.

In this implementation, the mobile device (or the remote computer system) can also: detect the display in a second region of a second image in this sequence; and detect a second feature in the second region of the second image corresponding to a second frame type rendered on the display, such as defined in the step of the augmented digital procedure or associated with the machine more generally. If this step of the augmented digital procedure does not specify recordation of a value from the second frame type or if this step of the augmented digital procedure specifically specifies no recordation of a value from the second frame type, the mobile device can discard the second image. Alternatively, if this step of the augmented digital procedure does specify recordation of a value from the second frame type, the mobile device can: retrieve a second data extraction model associated with this second feature—and therefore with this second frame type—in this step of the augmented digital procedure; implement methods and techniques described above to extract a second value from the second region of the second image according to this second data extraction model; and then store this second value—in a second format associated with the second frame type in the step—in the procedure file for this augmented digital procedure.

13. Data Calibration

In one variation, the remote computer system (or the mobile device) can also verify data extracted from an image by confirming that a display detected in the image was calibrated (e.g., met calibration limitations assigned to the machine) at the time the image was recorded. For example, the computer system can: access calibration records for equipment in the facility, such as a database or table listing dates and times that individual machines and supporting equipment in the facility were last calibrated; and verify that a duration of time from the timestamp on the image to a last calibration time for the machine is less than a specified calibration duration for the machine. If so, the remote computer system can verify this value extracted from this image and store this value accordingly. If not, the remote computer system can determine that the machine was not calibrated at the time of this data capture and either discard this value or store this value with a flag as not verified.

14. Data Verification

In one variation shown in FIG. 2, the mobile device and/or the remote computer system can: execute the foregoing methods and techniques to passively capture an image of a machine or display during a step of an augmented digital procedure and to automatically extract a value from a region of this image depicting a display designated for data capture during the concurrent step of the augmented digital procedure; and then compare this automatically-extracted value to a value manually recorded by the operator during this step of the augmented digital procedure in order to verify accuracy of these data; and then selectively flag this step of the augmented digital procedure and these data for review (e.g., by a supervisor)—such as in real-time or upon conclusion of the augmented digital procedure—responsive to detecting a difference between these automatically-extracted and manually-recorded values.

For example, the mobile device can: passively capture a video feed during a step of the augmented digital procedure; select an image from this video feed when a display on a machine designated for data capture and verification in the step falls within the field of view of the mobile device's camera; implement the foregoing methods and techniques to extract a value from this image; and then store this value—as a verification value linked to the step—in the procedure file for this instance of the augmented digital procedure. Furthermore, during this step, the mobile device can also prompt the operator to manually record a reference value for this step according to the augmented digital procedure. For example, the mobile device can: render a graphical user interface and record a reference value manually entered into the graphical user interface by the user; or record an audio clip of the user speaking the reference value and then implement speech-to-text techniques to extract this reference value from the audio clip. The mobile device can then: store the reference value—linked to this step in the augmented digital procedure—in the procedure file; compare the verification value and the reference value; and then flag the procedure file (e.g., this step specifically or this instance of the augmented digital procedure more generally) for review in response to detecting a difference between the verification value and the reference value. For example, in response to detecting a difference between the verification value and the reference value, the mobile device (or the remote computer system) can serve these values, a video clip spanning capture of these values, and a prompt to review these data to a second device—such as carried or monitored by a supervisor, an administrator, or a second operator—for review, such as in real-time or following completion of this instance of the augmented digital procedure. Alternatively, in response to detecting a difference between the verification value and the reference value, the mobile device can serve a prompt the operator to confirm the reference value before transitioning to a next step of the augmented digital procedure.

15. Operator Feedback and Processing Resources

In another variation, the mobile device (or the remote computer system) can return confirmation to the operator that a value—designated for capture during the current step of the augmented digital procedure—was successfully captured and then enable or automatically transition to a next step of the augmented digital procedure.

In one implementation in which the mobile device transmits an image or video feed to the remote computer system for processing and data extraction during a step of an augmented digital procedure, the remote computer system can: implement the foregoing method and technique to extract a value from this image or video feed; store this image in a procedure file for this instance of the augmented digital procedure; and then transmit confirmation of data capture to the mobile device accordingly. The mobile device can then close this step of the augmented digital procedure and automatically open a next step of the augmented digital procedure in response to receipt of confirmation of data capture from the remote computer system.

16. Procedure File

The mobile device and/or the remote computer system can write data recorded manually by the operator and data recorded automatically by the mobile device and/or by the remote computer system to a unique procedure file for this unique instance of the augmented digital procedure, as shown in FIGS. 1, 2, 3, and 6. For example, the mobile device can geotag and timestamp these active and passive data in the procedure file and can write an identifier of the particular machine (e.g., a machine make, model, and serial number), an identifier of the operator (e.g., an employee ID number), and an augmented digital procedure identifier (e.g., procedure ID and revision number) to this procedure file. The remote computer system can then load data recoded during this instance of the augmented digital procedure into corresponding input fields in the procedure file and then upload the procedure file to a remote database following conclusion of this instance of the augmented digital procedure.

17. Timing

The mobile device can locally execute the foregoing methods and techniques in (near) real-time during completion of a step of the augmented digital procedure and can serve feedback to the operator to confirm that a value was detected on a display and stored, such as by rendering augmented reality content on a heads-up display of the mobile device. In this implementation, the mobile device can also serve a prompt to the operator in (near) real-time to verify the value derived automatically by the mobile device during the current step of the augmented digital procedure; and the mobile device can write this value to the procedure file or repeat the foregoing methods and techniques to extract a new value for the current step of the augmented digital procedure based on feedback provided by the operator.

Alternatively, the mobile device or the remote computer system can execute the foregoing methods and techniques asynchronously. For example, the mobile device can upload image data to a remote database, such as in real-time, upon conclusion of a step of the augmented digital procedure, or upon conclusion of this instance of the augmented digital procedure. The remote computer system can then implement methods and techniques described above to process these images, to extract values from displays depicted in these images, and to store these values in the procedure file for this instance of the augmented digital procedure.

18. Tele-Presence

In one variation, the foregoing methods and techniques are executed by an autonomous robotic system deployed in the facility, such as an autonomous tele-presence robot including a camera and wireless communication module mounted to an autonomous wheeled platform. In this variation, the robotic system can autonomously navigate through the facility—such as up to displays arranged on fixed and mobile equipment within the facility—and record images of these displays. The robotic system or the remote computer system can then extract values from these images according to processes described above and write these data to a remote database. An autonomous or human supervisor or administrator may then review these data to verify operation of equipment throughout the facility, such as without requiring human personnel to physically interface with this equipment.

19. Fixed Sensor

In another variation shown in FIG. 6, a sensor block (or "fixed sensor")—including a camera and (wireless) communication module—is fixedly mounted to a single machine or installed in a fixed position in the facility and oriented to face one or a set of displays on one or more machines in the facility. In this variation, the sensor block can regularly or intermittently record images of these displays, and the sensor block or the remote computer system can then extract values from these images, as described above, and store these data in a remote database. The remote computer system can therefore interface with fixed sensors deployed on or near displays within the facility to retrieve data from these non-networked (or "siloed") machines without requiring human personnel to physically interface with this equipment.

19.1 Continuous Monitoring

In one implementation, the sensor block captures a continuous video feed (e.g., at a frame rate of 24 H), an intermittent video feed (e.g., one two-second video clip per minute), or intermittent images (e.g., one image per ten-minute interval) and returns this video feed or image to the remote computer system. The remote computer system then implements the foregoing methods and techniques to extract a value from this video feed or image. For example, the computing device can retrieve a data extraction model for this video feed or image based on: known locations and orientations of the sensor block and other machines in the facility and known locations of displays on these machines; a feature identifying a particular machine detected in the video feed or image and known type and location of a display on this machine; a feature identifying the display directly in this video feed or image; a data extraction model linked to the sensor block generally or to a particular region in a field of view of the camera in the sensor block, such as by an administrator or technician when the sensor block was installed in the facility.

The remote computer system can then write a timestamped value—extracted from a video feed or image received from the sensor block—to a machine file associated with the machine depicted in the video feed or image. Additionally or alternatively, the remote computer system can: access a schedule of procedures performed at this machine; identify a particular procedure occurring on the machine at a time that this video feed or image was recorded by the sensor block; and then write this timestamped value—extracted from this video feed or image—to a procedure file associated with this particular procedure at this machine. The remote computer system can thus distribute values extracted from data captured by the fixed sensor block to procedure files for procedures performed at corresponding times at a corresponding machine in the facility.

19.2 Cooperative Fixed Sensor and Mobile Device

In another implementation shown in FIG. 5C, the remote computer system selectively triggers the fixed sensor block to capture a video feed and/or image when a procedure is active at the machine in the field of view of the sensor block.

For example, the remote computer system can trigger the sensor block to capture a video feed in response to activation of an augmented digital procedure at a mobile device carried by an operator. The mobile device and/or the remote computer system can then execute the foregoing Blocks of the method to extract values from both images captured by the mobile device and images captured by the sensor block during completion of this augmented digital procedure. The remote computer system can then these store values in the procedure file for this augmented digital procedure.

Alternatively, the remote computer system (or the mobile device) can: default to writing values extracted from images captured by the mobile device to the procedure file for this step of the augmented digital procedure; and implement the foregoing methods and techniques to track the location of the mobile device during a step of the augmented digital procedure to estimate (or detect) the position of a display on the machine—designated for image capture during this step of the augmented digital procedure—in the field of view of the sensor block. Then, if the estimated (or detected) position of the display falls outside of the field of view of the mobile device during a particular time during this step of the augmented digital procedure, the remote computer system can: access an image captured by the sensor block at approximately this particular time; and extract a value, presented on the display at approximately this particular time, from a region of this image; and store this value—associated with the particular time—in the procedure file in place of a value extracted from a concurrent image captured by the mobile device (which may not depict the display on the machine).

Similarly, in this implementation, the remote computer system can write a value extracted from a first image recorded by the fixed sensor block—in place of a value extracted from a concurrent image captured by the mobile device during this instance of the augmented digital procedure—if the concurrent image captured by the mobile device is blurry, if glare is detected in a region of the concurrent image depicting the display, or if this concurrent image is otherwise defective or of low quality; and vice versa.

(Furthermore, in this variation, the fixed sensor block can execute the foregoing processes locally to extract value from images captured by the sensor block and then return these values to the remote computer system for recordation.)

19.3 Autonomous Mobile Camera

In another implementation shown in FIG. 6, the remote computer system can implement similar methods and techniques to extract data—rendered on a display of a machine in the facility—from an image captured by an autonomous mobile camera deployed within the facility and to selectively store these extracted data in procedure files and/or other files associated with this machine.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a operator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically capturing data from non-networked production equipment includes:
   detecting a first location of a mobile device within a facility at a first time during performance of a step of an augmented digital procedure at a machine in the facility by an operator;
   in response to the first location of the mobile device falling within a threshold offset from the machine at the first time, triggering an optical sensor in the mobile device to capture a first image of the machine;
   detecting a display on the machine in a first region of the first image;
   detecting a first value, presented on the display at approximately the first time, in the first region of the first image; and
   storing the first value in a procedure file for the augmented digital procedure performed at the machine.

2. The method of claim 1:
   further comprising:
      detecting a first orientation of the mobile device within the facility at the first time; and
      estimating a first position of the mobile device relative to the display on the machine at the first time based on the first location and the first orientation; and
   wherein triggering the optical sensor in the mobile device to capture the first image of the machine comprises triggering the optical sensor in the mobile device to capture the first image of the machine further in response to the first position of the mobile device falling within a threshold distance and a threshold angular offset from the display on the machine at the first time.

3. The method of claim 1:
   wherein triggering the optical sensor in the mobile device to capture the first image of the machine comprises triggering the optical sensor in the mobile device to capture a sequence of images at approximately the first time, the sequence of images comprising the first image and a second image;
   further comprising:
      detecting a first feature in the first region of the first image corresponding to a first frame type rendered on the display;
      detecting the display in a second region of the second image;
      detecting a second feature in the second region of the second image corresponding to a second frame type rendered on the display; and
      in response to detecting the second feature in the second image, discarding the second image; and
   wherein storing the first value in the procedure file for the augmented digital procedure performed at the machine comprises storing the first value in the procedure file in response to the augmented digital procedure specifying data capture from the first frame type rendered on the display.

4. The method of claim 1:
wherein detecting the first location of the mobile device within the facility at the first time comprises detecting the first location of the mobile device worn by the operator at the first time while performing the step of the augmented digital procedure at the machine; and
wherein storing the first value in the procedure file for the augmented digital procedure performed at the machine comprises storing the first value, linked to the step, in the procedure file for the augmented digital procedure.

5. The method of claim 1:
further comprising accessing a display model associated with the step of the augmented digital procedure;
wherein detecting the display on the machine in the first region of the first image comprises detecting a set of features, analogous to template display features defined in the display model, in the first region of the first image; and
wherein detecting the first value in the first region of the first image comprises transforming the set of features, detected in the first region of the first image, into the first value according to the display model.

6. The method of claim 1:
further comprising retrieving a first data extraction model from a set of data extraction models stored in a database, the first data extraction model specified in the augmented digital procedure, linked to the step, and corresponding to a type of the display on the machine; and
wherein detecting the first value in the first region of the first image comprises:
extracting a set of features from the first region of the first image; and
interpreting the first value from the set of features according to the first data extraction model.

7. The method of claim 6, wherein retrieving the first data extraction model from the set of data extraction models comprises selecting the first data extraction model from the set of data extraction models comprising:
a dial-type data extraction model defining detection of a dial in an image, detection of a needle within the dial in the image, and interpretation of a value from the image based on a position of the needle relative to the dial;
a multi-segment-type data extraction model defining detection of a multi-segment display in an image and interpretation of a value from the multi-segment display; and
a digital-type data extraction model defining detection of a digital display in an image and interpretation of a value from the digital display.

8. The method of claim 6:
wherein retrieving the first data extraction model comprises retrieving the first data extraction model defining detection of a dial in an image, detection of a needle within the dial in the image, and interpretation of a value from the image based on the dial and the needle;
further comprising retrieving a dial mask comprising a set of virtual dial indicators associated with the display on the machine and linked to the step of the augmented digital procedure; and
wherein detecting the display on the machine in the first region of the first image comprises, based on the first data extraction model:
detecting the display comprising an analog dial in the first region of the first image; and
detecting an analog needle in the first region of the first image; and
wherein detecting the first value in the first region of the first image comprises:
projecting the dial mask onto the analog dial detected in the first image; and
interpreting the first value from the first image based on a position of the analog needle relative to the set of virtual dial indicators in the dial mask.

9. The method of claim 1:
wherein triggering the optical sensor in the mobile device to capture the first image of the machine comprises triggering the optical sensor in the mobile device to capture a sequence of images over a duration of time specified in the step of the augmented digital procedure, the sequence of images comprising the first image;
wherein detecting the first value in the first region of the first image comprises extracting a sequence of values from regions in the sequence of images depicting the display;
further comprising aggregating the sequence of values into a timeseries of values based on timestamps of images in the sequence of images; and
wherein storing the first value in the procedure file for the augmented digital procedure comprises storing the timeseries of values in the procedure file.

10. The method of claim 1:
wherein triggering the optical sensor in the mobile device to capture the first image of the machine comprises triggering the optical sensor in the mobile device to capture a sequence of images over a duration of time specified in the step of the augmented digital procedure, the sequence of images comprising the first image;
wherein detecting the first value in the first region of the first image comprises extracting a sequence of values from regions in the sequence of images depicting the display;
further comprising calculating rates of change across values in the sequence of values; and
wherein storing the first value in the procedure file for the augmented digital procedure comprises storing the first value following a segment of the sequence of values exhibiting less than a threshold rate of change.

11. The method of claim 1, further comprising, in response to detecting the first value in the first region of the first image:
generating a notification confirming data capture from the machine;
at the mobile device, presenting the notification to the operator; and
closing the step of the augmented digital procedure.

12. The method of claim 1:
further comprising, at the mobile device, capturing a video feed via the optical sensor during the augmented digital procedure;
wherein detecting the first location of the mobile device within the facility at the first time comprises:
extracting a constellation of features from the video feed; and
calculating the first location and a first orientation of the mobile device within a localization map of the facility that aligns the constellation of features to corresponding features represented in the localization map; and further comprising:

projecting a field of view of the optical sensor into the localization map based on the first location of the mobile device, the first orientation of the mobile device, and optical characteristics of the optical sensor; and predicting presence of the display in the field of view of the optical sensor in response to the field of view of the optical sensor, projected onto the localization map, containing a location of the display represented in the localization map; and wherein triggering the optical sensor in the mobile device to capture the first image of the machine comprises triggering the optical sensor in the mobile device to capture the first image of the machine in response to predicting presence of the display in the field of view of the optical sensor at the first time.

13. The method of claim 1, further comprising, during a second step of the augmented digital procedure:

rendering a video feed captured by the optical sensor on a viewfinder of the mobile device;

accessing a virtual guide associated with the second step of the augmented digital procedure;

rendering the virtual guide over the video feed on the viewfinder;

prompting the operator to align the virtual guide, rendered on the viewfinder, with a second display on the machine;

recording a second image in response to detecting alignment between the virtual guide rendered on the viewfinder and a second display on the machine;

detecting a second value, presented on the second display, in the second image; and storing the second value, associated with the second step, in the procedure file for the augmented digital procedure performed at the machine.

14. The method of claim 1:

wherein storing the first value in the procedure file for the augmented digital procedure comprises storing the first value as a verification value, linked to the step in the augmented digital procedure, in the procedure file; and further comprising:

at the mobile device, prompting the operator to manually record a reference value for the step according the augmented digital procedure;

storing the reference value, linked to the step in the augmented digital procedure, in the procedure file; and in response to a difference between the verification value and the reference value, flagging the procedure file for review.

15. The method of claim 1:

further comprising:

accessing a document specifying a set of steps of a procedure for an equipment type of the machine, the set of steps comprising the step;

linking a first description of the step in the procedure, extracted from the document, to a first input field;

assigning a first capture type to the first input field;

generating a digital draft procedure comprising a set of descriptions of the set of steps extracted from the procedure and the first input field specifying capture of data of the first capture type from the equipment type;

at an initial time preceding the first time, serving the digital draft procedure to a second mobile device, assigned to a second operator, for completion at the machine;

defining a first spatial trigger for capturing data from the display on the machine during the step based on a position of the second mobile device during completion of the step in the digital draft procedure by the second operator;

generating the augmented digital procedure comprising the set of descriptions of the set of steps, comprising the first spatial trigger for capturing data from the display during the step, defining the first capture type for the step, and linking the first spatial trigger to the first capture type and the first input field for the step; and following the initial time, serving the augmented digital procedure to the mobile device;

wherein selecting the first image comprises selecting the first image in response to proximity of the first location of the mobile device to the first spatial trigger during completion of the step in the augmented digital procedure;

wherein detecting the first value in the first region of the first image comprises extracting the first value from the first region of the first image according to the first capture type; and wherein storing the first value in the procedure file for the augmented digital procedure comprises storing the first value, linked to the first input field, in the procedure file.

16. The method of claim 1:

wherein storing the first value in the procedure file comprises storing the first value, linked to the step of the augmented digital procedure, in the procedure file; and further comprising:

detecting a second location of the mobile device within the facility at a second time during a second step of the augmented digital procedure;

in response to the second location of the mobile device falling outside of the threshold offset from the machine at the second time, accessing a second image captured by a fixed camera at approximately the second time, the fixed camera arranged in the facility and defining a second field of view intersecting the display;

detecting the display on the machine in a second region of the second image;

detecting a second value, presented on the display at approximately the second time, in the second region of the second image; and storing the second value, linked to the second step of the augmented digital procedure and associated with the second time, in the procedure file.

17. A method for automatically capturing data from non-networked production equipment includes:

accessing a first image captured by an optical sensor within a facility at a first time during performance of a step of an augmented digital procedure at a machine in the facility by an operator;

in response to the step in the augmented digital procedure specifying data capture from a display of the machine, accessing a visual display feature representing the display;

detecting the display in a first region of the first image based on the visual display feature;

extracting a first value, presented on the display at the first time, from the first region of the first image; and storing the first value in a procedure file for the augmented digital procedure performed at the machine.

18. The method of claim 17, wherein accessing the first image comprises accessing the first image captured by the optical sensor integrated into a mobile device worn by the operator during the augmented digital procedure at the machine.

19. The method of claim 17:

further comprising retrieving a first data extraction model from a set of data extraction models stored in a database, the first data extraction model specified in the augmented digital procedure, linked to the step, and corresponding to a type of the display on the machine; and wherein detecting the first value in the first region of the first image comprises:

extracting a set of features from the first region of the first image; and interpreting the first value from the set of features according to the first data extraction model.

20. A method for automatically capturing data from non-networked production equipment includes:

accessing a first image captured by an optical sensor within a facility at a first time during performance of a step of an augmented digital procedure at a machine in the facility by an operator;

in response to the step in the augmented digital procedure specifying data capture from a display of the machine, accessing a data extraction model, from a set of data extraction models, defining extracting of data linked to the step of the augmented digital procedure from images of the display;

detecting the display in a first region of the first image based on the visual display feature;

extracting a first value, presented on the display at the first time, from the first region of the first image based on the data extraction model; and storing the first value in a procedure file for the augmented digital procedure performed at the machine.

* * * * *